United States Patent
Tang et al.

(10) Patent No.: US 11,031,039 B1
(45) Date of Patent: Jun. 8, 2021

(54) CIRCUITS AND METHODS FOR OPTIMIZING WRITE CURRENT WAVEFORM FOR MAIN POLE RELAXATION IN PERPENDICULAR MAGNETIC RECORDING

(71) Applicant: Headway Technologies, Inc., Milpitas, CA (US)

(72) Inventors: Yuhui Tang, Milpitas, CA (US); Ying Liu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/997,161

(22) Filed: Aug. 19, 2020

(51) Int. Cl.
  *G11B 5/00* (2006.01)
  *G11B 20/10* (2006.01)
  *G11B 5/012* (2006.01)
  *G11B 21/16* (2006.01)

(52) U.S. Cl.
  CPC ........ *G11B 20/10027* (2013.01); *G11B 5/012* (2013.01); *G11B 21/16* (2013.01)

(58) Field of Classification Search
  CPC ....... G11B 5/09; G11B 20/10; G11B 20/0013; G11B 5/00; G11B 5/035; G11B 5/02; G11B 20/10027
  USPC ................... 360/55, 39, 46, 67, 65
  See application file for complete search history.

(56) References Cited

U.S. PATENT DOCUMENTS

| | | | |
|---|---|---|---|
| 8,537,487 B2 | 9/2013 | Goldberg et al. | |
| 8,687,311 B2 | 4/2014 | Dakroub et al. | |
| 9,153,248 B1 | 10/2015 | Contreras et al. | |
| 9,275,656 B1 | 3/2016 | Contreras et al. | |
| 9,978,401 B1 * | 5/2018 | Rivkin | G11B 5/012 |

OTHER PUBLICATIONS

"A 1.2 Gb/s Write Driver with Pre-emphasis Overshoot Control Optimized for High Density HDD Applications," by Y. Hayashi et al., IEEE 2005 Custom Integrated Circuits Conference, Sep. 21, 2005, pp. 519-522.

"Characterization of Write-Signal Efficiency Utilizing Write-Current Dynamic Wave-Shaping," by John Contreras et al., IEEE Transactions on Magnetics, vol. 53, No. 2, Feb. 2017, 7 pages.

"Writer Pole Tip Remanence in Perpendicular Recording," by Daniel Z. Bai et al., IEEE Transactions on Magnetics, vol. 42, No. 3, Mar. 2006, pp. 473-480.

* cited by examiner

*Primary Examiner* — Nabil Z Hindi
(74) *Attorney, Agent, or Firm* — Saile Ackerman LLC; Stephen B. Ackerman; Billy J. Knowles

(57) ABSTRACT

A preamplifier that that is configured for optimizing the write current waveform to achieve the best areal density capability (ADC) and adjacent track interference (ATI) performance of a magnetic recording disk drive. The preamplifier is configured for providing a magnetic head write current with a main pole relaxation zone for providing a buffer zone for main pole relaxation from saturation state to a remanence state before writing the next bit. The preamplifier is further configured for providing a magnetic head write current with a reference main pole relaxation current located at an end region data of each bit. The length of the reference main pole relaxation current is a function of the bit length, frequency, recording velocity, and writer/media switching speed.

28 Claims, 14 Drawing Sheets

| $I_W$ IN MPRZ | SNR |
|---|---|
| POR | 14.16 |
| 0mA | 14.97 |
| −10mA | 14.99 |
| −20mA | 13.22 |
| −30mA | 12.32 |

FIG. 8F

| $I_W$ IN MPRZ | By THRESHOLD | STE |
|---|---|---|
| POR | 1000 | 0.92 |
| 0mA | 1000 | 0.33 |
| −10mA | 1000 | 0.30 |
| −20mA | 1000 | 0.32 |
| −30mA | 1000 | 0.37 |

FIG. 9B

CIRCUITS AND METHODS FOR OPTIMIZING WRITE CURRENT WAVEFORM FOR MAIN POLE RELAXATION IN PERPENDICULAR MAGNETIC RECORDING

TECHNICAL FIELD

This disclosure generally relates to magnetic hard disc drive data storage systems. More particularly, the present disclosure relates to circuits and methods for pre-compensation of encoded data for writing data to the magnetic hard disc drive at high data rates.

BACKGROUND

FIG. 1 is a representation of a magnetic hard disk drive 10 of the prior art. Input data from an external device is applied to the magnetic hard disk drive 10 through the data input terminal 100. Output data is transferred from the magnetic disk drive 10 through the data output terminal 185 and to an external device.

The input data applied to the data input terminal 100 is applied to the disk controller 20. The disk controller 20 encodes the data input signal 100 with a digital line code such as a "non-return to zero inverted" (NRZI) modulated conversion code that is structured for writing the magnetic disk 50. The formatted data input is transferred to the preamplifier 30 for conversion to the head current used to generate the magnetic field for writing the magnetic disk 50.

Further, the controller 20 receives the data read from the magnetic disk 50 through the preamplifier 30. The preamplifier 30 and the controller 20 conditions the signals read from the magnetic disk 50 to regenerate the NRZI modulated conversion code word. The controller 20 then decodes the NRZI modulated conversion codeword to generate the output data. The output data is transferred through the terminal 185 to the external device. Control data is applied to the controller 20 through the terminal 135 for communicating control information such as data request, I/O read/write, channel ready, address, data acknowledge, etc.

A head arm or head stack assembly 25 has the magnetic read/write head 55 mounted at a distal end of the arm-head assembly 25. A voice coil 35 is mounted at an opposite end of the head arm or head stack assembly 25. The voice coil 35 receives control signals from the controller 20 for causing the magnetic read/write head assembly 55 to move across the disk 50. The magnetic read/write head 55 is then able to read from and record to the disk 50.

The preamplifier 30 is mounted on the head arm assembly 25. A trace 45 is connected from the preamplifier 30 to the magnetic read/write head 55 to transfer the data and control signals between the preamplifier 30 and the magnetic read/write head 55. The trace 45 is also secured to the head arm assembly 25.

FIG. 2 is a block diagram of a controller 20 and preamplifier 30 of the prior art. The input data 100 is transferred to a controller circuit 105 and is applied to an Error Correction Code (ECC) circuit 110 that generates an ECC code from the input data and is appended to the input data. The input data with the appended ECC Code is then an input to an NRZI write encoder 115 that the input data 100 with the appended ECC code to an NRZI format acceptable to the hard disk media for writing the data to the hard disk. The NRZI modulated conversion code word is then transferred to a preamplifier 120 and thus to a pre-compensation circuit 125. The pre-compensation circuit 125 conditions the encoded data to accommodate the transmission line characteristics of the trace 45 of FIG. 1 and the requirements of the magnetic disk 60 for correctly writing the data efficiently to the magnetic disk 60.

The pre-compensated data is applied to the write current driver 125 and the overshoot amplitude driver 130. The structure of the pre-compensated waveform includes the write current ($I_W$), overshoot amplitude (OSA), and overshoot duration (OSD). The preamplifier 120 pre-compensates data current waveform fine-tuning $I_W$/OSA/OSD (IAD) settings to achieve the best bits per inch (BPI), tracks per inch (TPI) and areal density capability (ADC) and thus optimizing the IAD settings. In general, the write current driver 125 and the overshoot amplitude driver 130 of the preamplifier 120 set the same write current ($I_W$), overshoot amplitude (OSA), and overshoot duration (OSD) for different frequency or bit length in the random recording bit sequence. Due to the dynamic magnetization switching in the write head 145 shows a strong dependence on the frequency, the magnetic erase widths (EW) varies for different frequencies/bit lengths, especially at a high data rate. In general, the lower frequencies/longer bits show wider erase width EW compared to the narrower erase width EWs in the higher frequencies/shorter bits.

The write current $I_W$ with the overshoot amplitude OSA and overshoot duration OSD are transferred to the PMR write head 15 in the read/write head assembly 140. The write current $I_W$ with the overshoot amplitude OSA and overshoot duration OSD is applied to the magnetic disk 60 to record the pre-compensated data to the magnetic disk 60.

The write control data 150 is received by the disk controller circuit 155 for supervising the encoding, decoding, synchronization control of the hard disk drive 10 of FIG. 1. The disk control circuit 155 provides a spindle motor driver control signal for activating a spindle motor driver 165 for turning the spindle motor for spinning the disk 50 of FIG. 1. The disk control circuit 155 also provides a voice coil driver 160 for actuating the voice coil to move the arm-head assembly over the surface of the disk 50 of FIG. 1.

Read data sensed by the read head 170 is transferred to the read current preamplifier 175, where the signals are amplified and transmitted to the read analog to digital (ND) converter 180 where the data voltage signals are converted to a sequence of digital data. The converted digital data is transferred to the NRZI read decoder 185 for converting the digital read data to the decoded read data with the attached ECC code. The read data with the attached ECC code is applied to an ECC correction circuit 190. The ECC correction circuit 190 corrects any errors that occur in the transmission path during writing, on the writing of the disk 50, and in the transmission path during reading. The corrected output data 195 from the ECC correction circuit 190 is transferred to the external device.

FIG. 3 is a plot of the write current waveform at the output of the preamplifier 120 to the input of the perpendicular magnetic recording (PMR) head 145 of the prior art. The waveform shows a pattern with two time periods (2T) of two zeroes, followed by a single time period (1T) of a single one, then three time periods (3T) of three zeroes, then two time periods (2T) of two ones, then one time period (1T) of a single zero, and then four time periods of four ones. There are three key control parameters in constructing the waveform, the write current $I_W$, the overshoot amplitude OSA, and the overshoot duration OSD. The write current $I_W$ sets the sufficient current amplitude to drive the main pole of the PMR head 145 to generate the magnetic recording field (Hy). The overshoot amplitude OSA and overshoot duration OSD are used to boost the magnetic recording field rise time and thus write sharp transitions between sequential bits, especially at high data rate recording. In the preamplifier of the prior art, write current $I_W$, the overshoot amplitude OSA, and overshoot duration OSD settings are independent of frequencies. Thus, the write current $I_W$ and the peak current Ipeak, which equals to the write current $I_W$ plus the overshoot amplitude OSA (Ipeak+OSA) are identical for all different frequencies.

FIG. 4 is a 2D map of recorded bit patterns on the recording media corresponding to the dynamic current waveform in FIG. 3 of the prior art. The rise time of the magnetic field (Hy) from the PMR head 145 depends on the dynamics of PMR head 145 and is approximately 50 ps to 200 ps in current state-of-the-art PMR head 150 design. The actual magnetic field (Hy) amplitudes and cross-track profiles are not identical for different frequencies under the identical write current ($I_W$), overshoot amplitude (OSA), and overshoot duration (OSD) (IAD) setting for all frequencies. Typically, long bits, which is greater than three clock time periods (>=3T), show wider erase width (EW) than the erase widths of the two clock time period (2T) bits and the one clock time period (1T) bits have a much narrower erase width (EW) than that of the two clock time period (2T) bits. Areal density capability (ADC) in PMR heads 145, is the product of on track linear density bit per inch (BPI) and cross-track density track per inch (TPI). Both better track linear density bit per inch (BPI) and cross-track density track per inch (TPI) are preferred. It's known in the art that reducing the erase width EW of long bits can improve the cross-track density track per inch (TPI). However, in current practice, the write current ($I_W$) is greater than or equal to 30 mA to maintain the healthy overwrite (OW).

Further, in current practice, most of the write current ($I_W$), overshoot amplitude (OSA), and overshoot duration (OSD) (IAD) optimization schemes set the low boundary of write current ($I_W$) range is 30 mA. With such constraint, reducing erase width (EW) means low overshoot amplitude (OSA) and low peak current Ipeak, which will impact the magnetic field (Hy) of the one clock time period (1T) bits and the two clock time period (2T) bits and hurt track linear density bit per inch (BPI). Hence there is no areal density capability (ADC).

SUMMARY

An object of this disclosure is to provide circuits and methods for optimizing the write current waveform to achieve the best areal density capability (ADC) and adjacent track interference (ATI) performance.

Another object of this disclosure is to provide circuits and methods for providing a magnetic head write current with a main pole relaxation zone for providing a buffer zone for main pole relaxation from saturation state to a remanence state before writing the next bit.

Further, another object of this disclosure is to provide circuits and methods for providing a magnetic head write current with a reference main pole relaxation current located at an end region data of each bit. The length of the reference main pole relaxation current is a function of the bit length, frequency, recording velocity, and writer/media switching speed.

Still further, another object of this disclosure is to provide circuits and methods for providing a magnetic head write current with a write main pole relaxation current located at an end region data of each bit. The amplitude of the write main pole relaxation current is a function of the bit length, frequency, recording velocity, and writer switching speed.

To accomplish at least one of these objects, a preamplifier has a main pole relaxation control circuit configured for generating a main pole relaxation zone current for concatenating an overshoot current zone and a write current zone of a magnetic head write current. The main pole relaxation zone current is applied to a PMR write head. The main pole relaxation control circuit has a main pole relaxation zone data synchronization circuit that is in communication with a read data preamplifier to receive a pseudorandom read data signal that is dependent on the bit length of the encoded data. The pseudorandom read data signal is applied to the main pole relaxation zone data synchronization circuit. The main pole relaxation zone data synchronization circuit then generates the main pole relaxation current that is concatenated with the overshoot current. The main pole relaxation control circuit has a comparator/selector that determines the configuration of the main pole relaxation zone current. The output of the main pole relaxation control circuit is applied to a write current and an overshoot driver to concatenate the main pole relaxation current with the overshoot current and the write current to form the write data current signal. The write data current signal is applied to the PMR write head for writing the encoded data to the HDD media.

The write data current signal is structured with the overshoot current zone, the write current zone, and the main pole relaxation zone current concatenated together. The concatenated overshoot current zone, the write current zone, and the main pole relaxation zone current pre-compensates the data current signal by fine-tuning overshoot current settings, the write current setting, main pole relaxation zone current settings. The pre-compensation achieves the best bits per inch (BPI), tracks per inch (TPI), and areal density capability (ADC).

To further accomplish at least one of these objects, a method for pre-compensating an encoded data signal begins with optimizing the write current. The optimum amplitude of the overshoot current zone for the frequencies or bit-lengths for the encoded data is then determined. An overshoot current zone is generated as a function pseudorandom read data signal.

A constant write current level is generated to be concatenated to the overshoot current zone. The amplitude of the overshoot current is based on the difference of the peak current and the amplitude of the write current.

A main pole relaxation zone duration is then determined. If the time duration of the NRZI modulated conversion code word is less than or equal to the overshoot duration, the data current signal is that of the overshoot current zone, only. If the time duration of the NRZI modulated conversion code word is greater than the overshoot duration and the if the time duration of the NRZI modulated conversion code word is less than the sum of the overshoot duration and the duration of a reference main pole relaxation zone, the data current signal is the width of the sum of the overshoot duration and the write current main pole relaxation zone.

If the time duration of the NRZI modulated conversion code word is less than to the overshoot duration combined with the reference main pole relaxation zone duration, the data current signal is the width of the sum of the overshoot duration, reference main pole relaxation zone duration, and the write current main pole relaxation zone duration.

When the main pole relaxation zone duration and structure are completed, the drive current is transferred to the write head.

BRIEF DESCRIPTION OF THE DRAWINGS

FIG. 8F is a table illustrating the signal to noise ratio (SNR) comparison of media recording patterns for POR current waveforms and MPRZ waveforms.

FIG. 9B is a table of the sidetrack erasure (STE) for the POR current waveform and the MPRZ waveform currents.

DETAILED DESCRIPTION

The circuits and methods of this application add a main pole relaxation zone to a write current waveform for a PMR head. As part of the function of the circuits and methods, the current amplitude and duration are fine tuned in the main pole relaxation zone. Both bits per inch (BPI) and tracks per inch (TPI) are increased, and the adjacent track interference (ATI) can be further improved over the present preamplifier current waveform. The main pole relaxation zone provides a buffer zone for main pole relaxation from saturation status to remanence state before writing the next bit.

Figure 4:
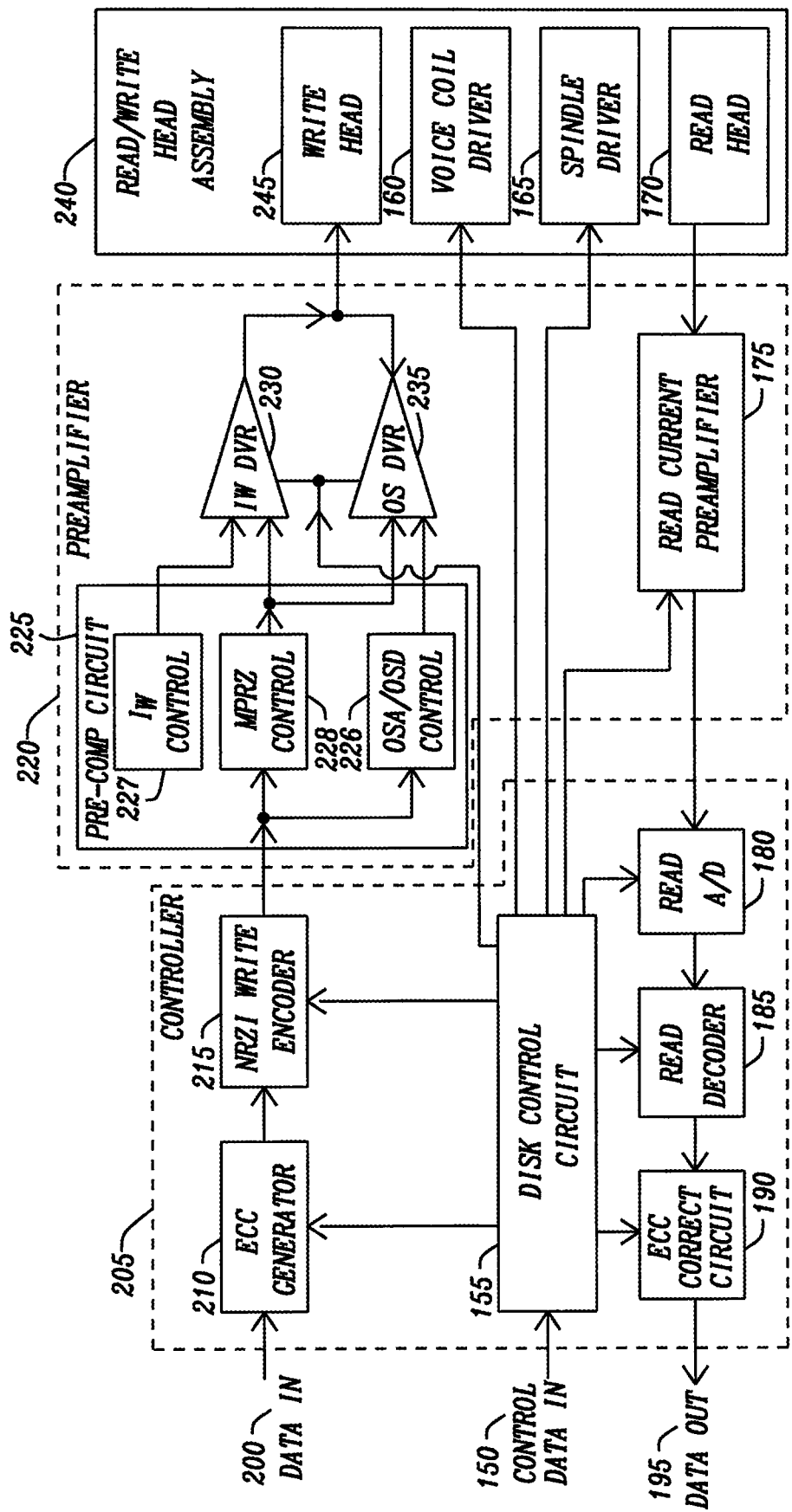
FIG. 4 is a block diagram of a controller and preamplifier embodying the principles of the present disclosure.

FIG. 4 is a block diagram of a controller and preamplifier embodying the principles of the present disclosure. The structure of the controller and preamplifier embodying the principles of the present disclosure is similar to that of the controller and preamplifier of the prior art, as shown in FIG. 2. The input data 200 is transferred to a controller circuit 205 and is applied to an Error Correction Code (ECC) circuit 210 that generates an ECC code from the input data that is appended to the input data. The input data with the appended ECC Code is then an input to an NRZI write encoder 215 that the input data 200 with the appended ECC code to an NRZI format acceptable to the hard disk media for writing the data to the hard disk. The NRZI modulated conversion code word is then transferred to a preamplifier 220 and thus to a pre-compensation circuit 225. The NRZI modulated conversion code word is conditioned the encoded data to accommodate the transmission line characteristics of the trace 45 of FIG. 1 and the requirements of the magnetic disk 60 for correctly writing the data efficiently to the magnetic disk 60. The NRZI modulated conversion code word is applied to the overshoot control circuit 226 and the write control circuit 227 of the pre-compensation circuit 225. The overshoot control circuit 226 is configured to control the overshoot amplitude (OSA), and the overshoot duration (OSD) of the first bit transition of the NRZI modulated conversion code word. The overshoot amplitude (OSA) and the overshoot duration (OSD) are used to boost the magnetic recording field rise time for fast writing the transition between sequential bits, especially in high data rate recording.

The write control circuit 226 is configured to set the write current $I_W$ to a sufficient current amplitude to drive the main pole to generate the magnetic recording field strength Hy to an appropriate level for recording the data.

The NRZI modulated conversion code word is also applied to the main pole relaxation zone (MPRZ) control circuit 228. The MPRZ control circuit 228 is configured to generate an MPRZ current signal that is placed before a next transition of the NRZI modulated conversion code word. The MPRZ current signal provides a buffer zone for main pole relaxation from saturation status to remanence state before the next write transition. The current waveform in the MPRZ can be optimized in different shapes to achieve the best recording performance.

The pre-compensated data is applied to the write current driver 225 and the overshoot amplitude driver 230. The structure of the pre-compensated waveform includes the overshoot amplitude (OSA) and overshoot duration (OSD) to boost the magnetic recording field rise time and write sharp transitions between sequential bits. The write current ($I_W$) is concatenated to the overshoot current and set to lower the current level of less than 30 mA and preferably approximately 15 mA to 20 mA. Between either the overshoot current or the write current ($I_W$) and the next transition, the MPRZ current is placed as the buffer zone.

The overshoot current with the concatenated write current $I_W$ and the MPRZ current are transferred to the PMR write head 15 in the read/write head assembly 240. The overshoot current and the concatenated write current $I_W$, and the MPRZ current is applied to the magnetic disk 60 to record the pre-compensated data to the magnetic disk 60.

Figure 1:
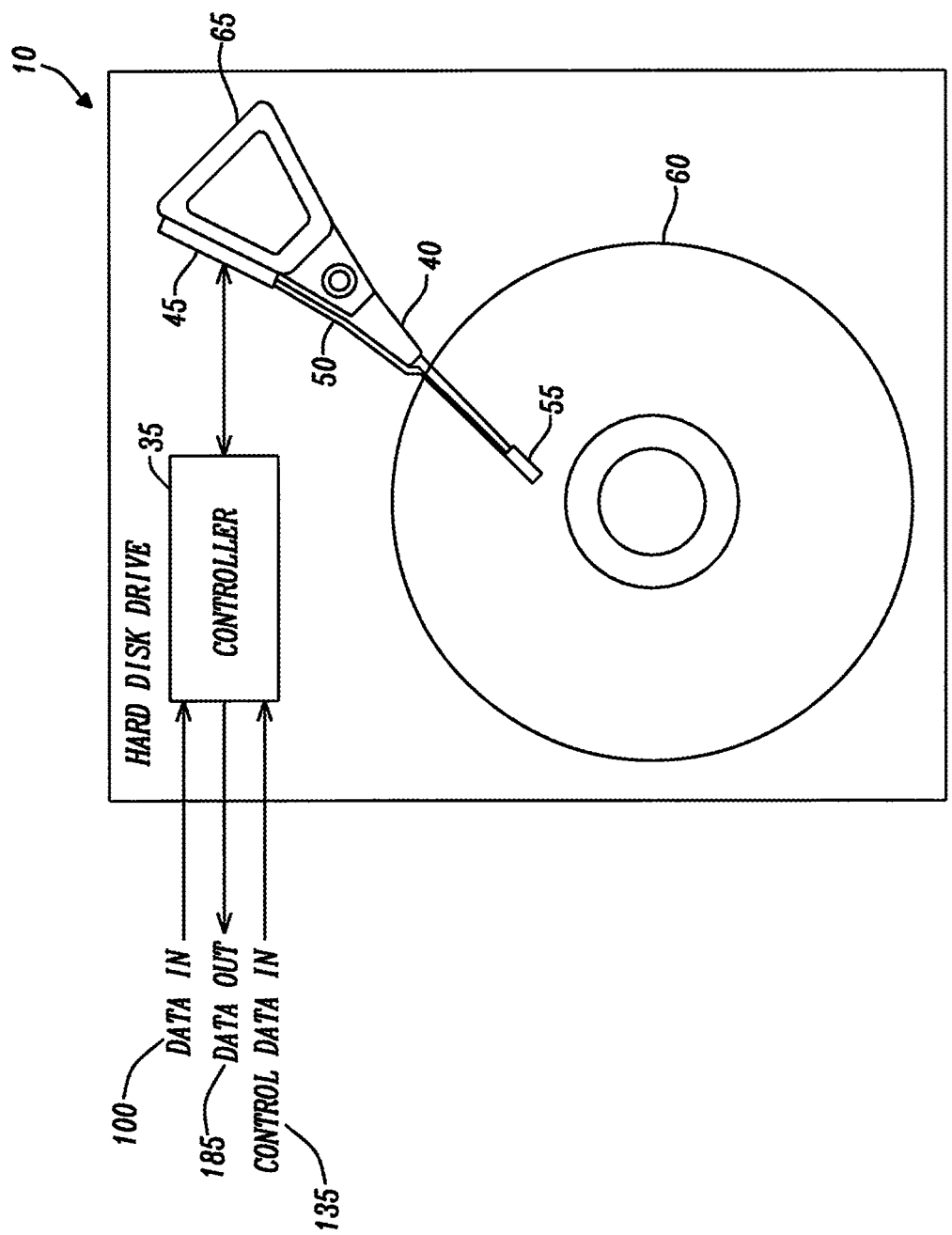
FIG. 1 is a representation of a magnetic hard disk drive of the prior art.
Figure 2:
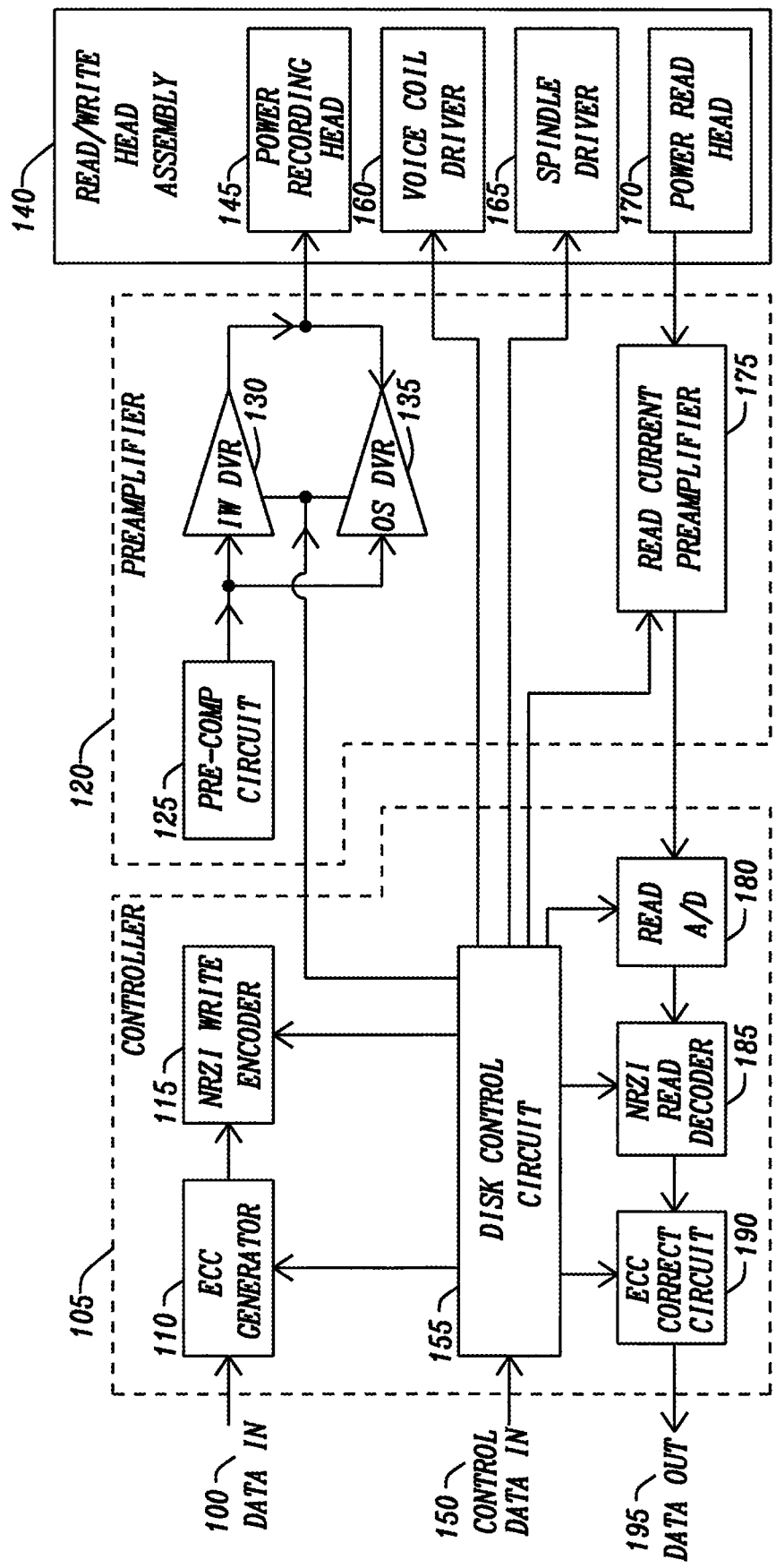
FIG. 2 is a block diagram of a controller and preamplifier of the prior art.
Figure 3:
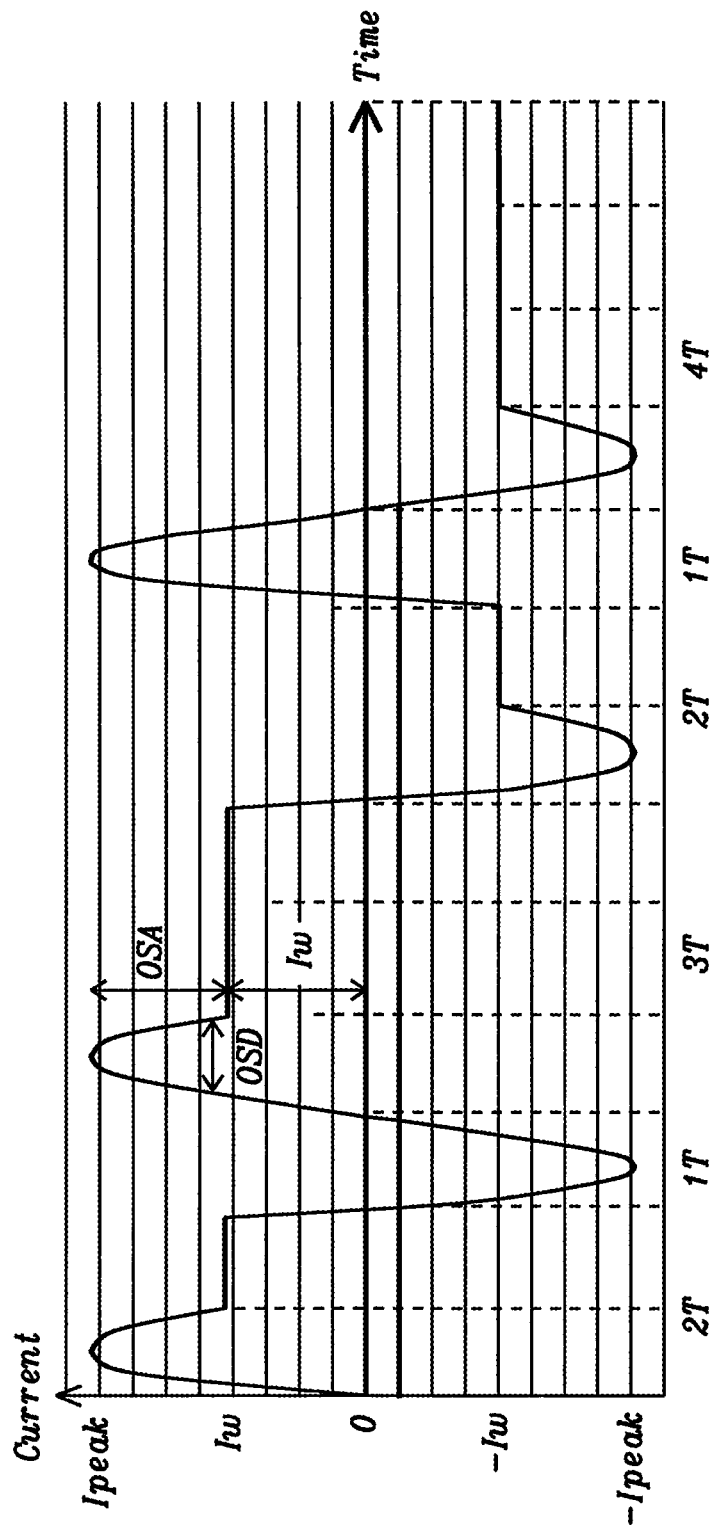
FIG. 3 is a plot of the write current waveform at the output of the preamplifier to the input of the perpendicular magnetic recording (PMR) head of the prior art.

The write control path is the same as that of FIG. 2, where the write control data 150 is received by the disk controller circuit 155 for supervising the encoding, decoding, synchronization control of the hard disk drive 10 of FIG. 1.

The read data path is identical to that of FIG. 2, where the read data sensed by the read head 270 is transferred to the read current preamplifier 275 through the read path as described in FIG. 2.

Figure 5:
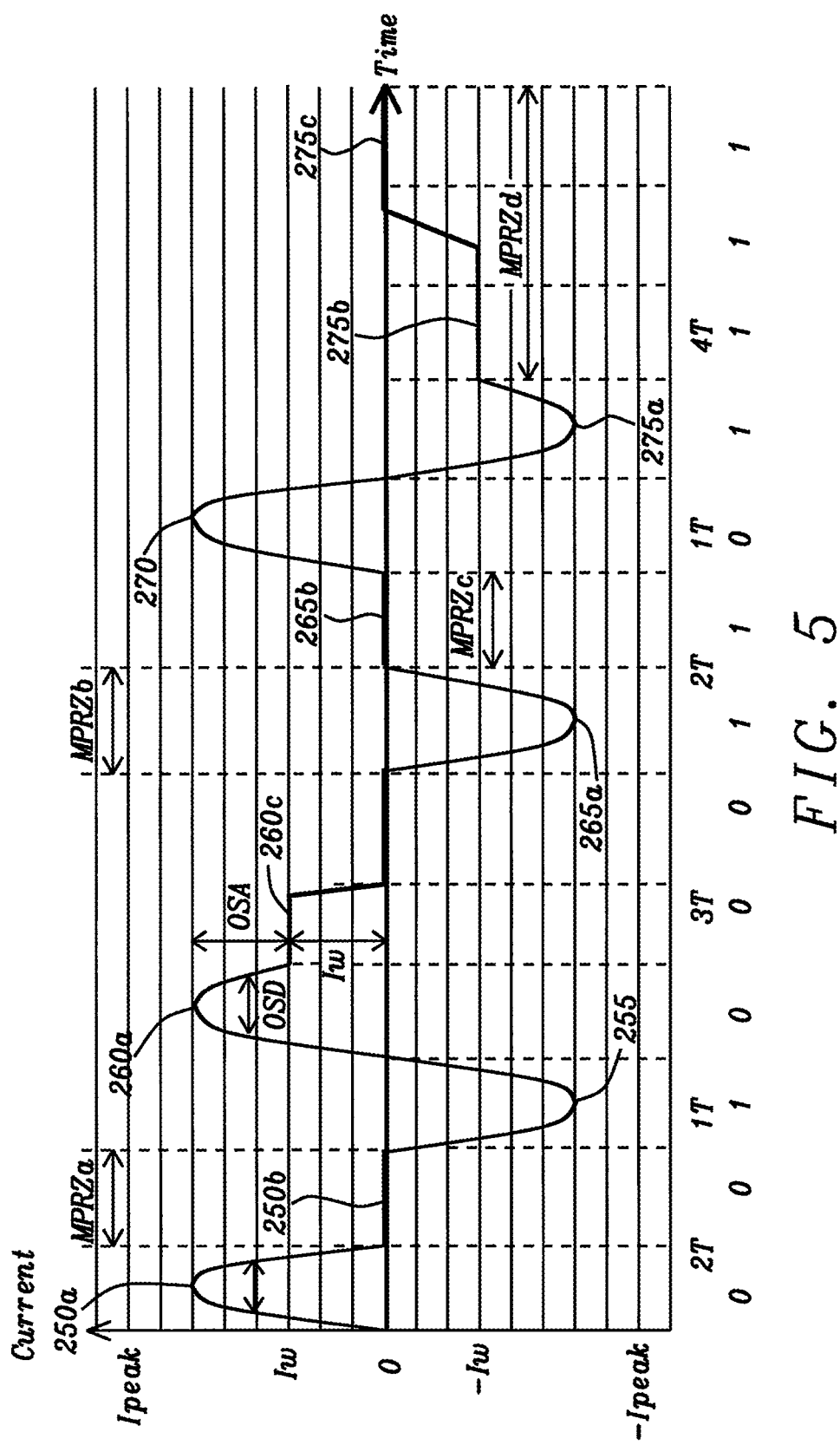
FIG. 5 is a plot of the write current waveform at the output of the preamplifier to the input of the perpendicular magnetic recording (PMR) head, illustrating the main pole relaxation zone embodying the principles of the present disclosure.

FIG. 5 is a plot of the write current waveform at the output of the preamplifier to the input of the perpendicular magnetic recording (PMR) head illustrating the main pole relaxation zone embodying the principles of the present disclosure. The write current waveform as illustrated shows a data transmission of a coding of digital data stream equal to (0, 0, 1, 0, 0 0, 1, 1, 0, 1, 1, 1, 1). The first signal data segment of the write current waveform is a positive transition 250a and 250b. The first portion 250a of the first signal data is an overshoot signal 250a of a transition to a zero data. The second portion 250b is a main pole relaxation zone MPRZa indicating a second consecutive zero data having no transition. The second signal data segment 255 of the write current waveform is a single zero data bit with a negative overshoot (undershoot) signal representing a data value (1). The third signal data segment of the write current waveform is a positive transition 260a, 260b, and 260c representing a data value of three consecutive zeros. The fourth portion of the write current waveform is a positive overshoot signal 260a with an overshoot amplitude (OSA) and overshoot duration (OSD) that is tuned to achieve the optimal bits per inch (BPI), tracks per inch (TPI) and areal density capability (ADC). The fifth portion 260b of the write current waveform includes the write current $I_W$ that sets the sufficient current amplitude to drive the main pole to generate the magnetic recording filed strength Hy. The sixth portion 260c of the write current waveform that is the main pole relaxation zone MPRZb. The main pole relaxation zone MPRZb provides a buffer zone for main pole relaxation from saturation status to remanence state before writing the next bit.

While the MPRZ 260c is set to approximately the ground reference level, the current waveform in the main pole relaxation zone MPRZb can be optimized in different shapes to achieve the best recording performance, as will be discussed hereinafter. The fourth signal data segment of the write current waveform is a negative transition 265a and 265b representing the data value of two consecutive ones. The first signal portion 265a is a negative overshoot (undershoot) signal representing a data value (1). The second signal portion 265b of the write current waveform is the main pole relaxation zone MPRZb. The main pole relaxation zone MPRZb provides a buffer zone for main pole relaxation from saturation status to remanence state before writing the next bit. The fifth signal data segment of the write current waveform is a positive transition 270 is a single data zero with an overshoot signal of a transition to the zero data. Since there is a single data bit for the data transition 270, the only portion of the write current waveform is a positive overshoot signal 270 with an overshoot amplitude (OSA) and overshoot duration (OSD). The sixth signal data segment of the write current waveform is a negative transition 275a, 275b, and 275c. The first portion 275a of the sixth signal data segment is a negative overshoot signal 275a with an overshoot amplitude (OSA) and overshoot duration (OSD). The second portion 275b of the sixth signal data segment of the write current waveform includes the write current $I_W$ that sets the sufficient current amplitude to drive the main pole to generate the magnetic recording filed strength Hy. The third portion 275c of the sixth signal data segment of the write current waveform that is the main pole relaxation zone MPRZc. The main pole relaxation zone MPRZc provides a buffer zone for main pole relaxation from saturation status to remanence state before writing the next bit. While the main pole relaxation zone MPRZd 275c is set to approximately the ground reference level, the current waveform in the main pole relaxation zone MPRZc can be optimized in different shapes to achieve the best recording performance, as will be discussed hereinafter.

FIGS. 6A, 6B, 6C, 6D, 6E are plots of the write current waveform with different write current settings in main pole relaxation zone embodying the principles of the present disclosure. The MPRZ write current is set with a duration of approximately 600 ps and is incrementally changed by sweeping from 0 mA to −80 mA. The clocking of each bit of the NRZI modulated conversion code word is approximately 1 ns, and the duration of the main pole relaxation zone MPRZ this example is approximately 600 ps. The initializing the write current $I_W$, the overshoot amplitude OSA, and the overshoot duration OSD that form the POR current 300 is set to approximately 45 ma. The MPRZ write current $I_{W\_MPRZ}$ levels are shown in Table 1

TABLE 1

Figure 6A:
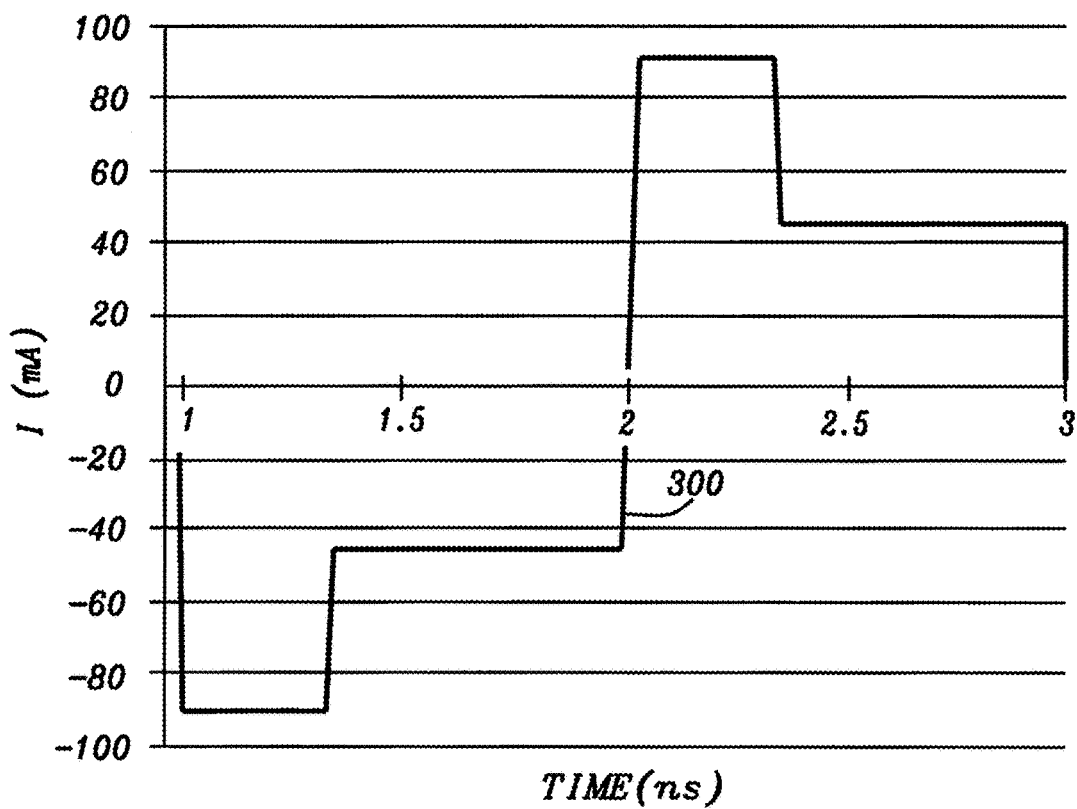
FIGS. 6A, 6B, 6C, 6D, 6E are plots of the write current waveform with different write current settings in main pole relaxation zone embodying the principles of the present disclosure.
Figure 6B:
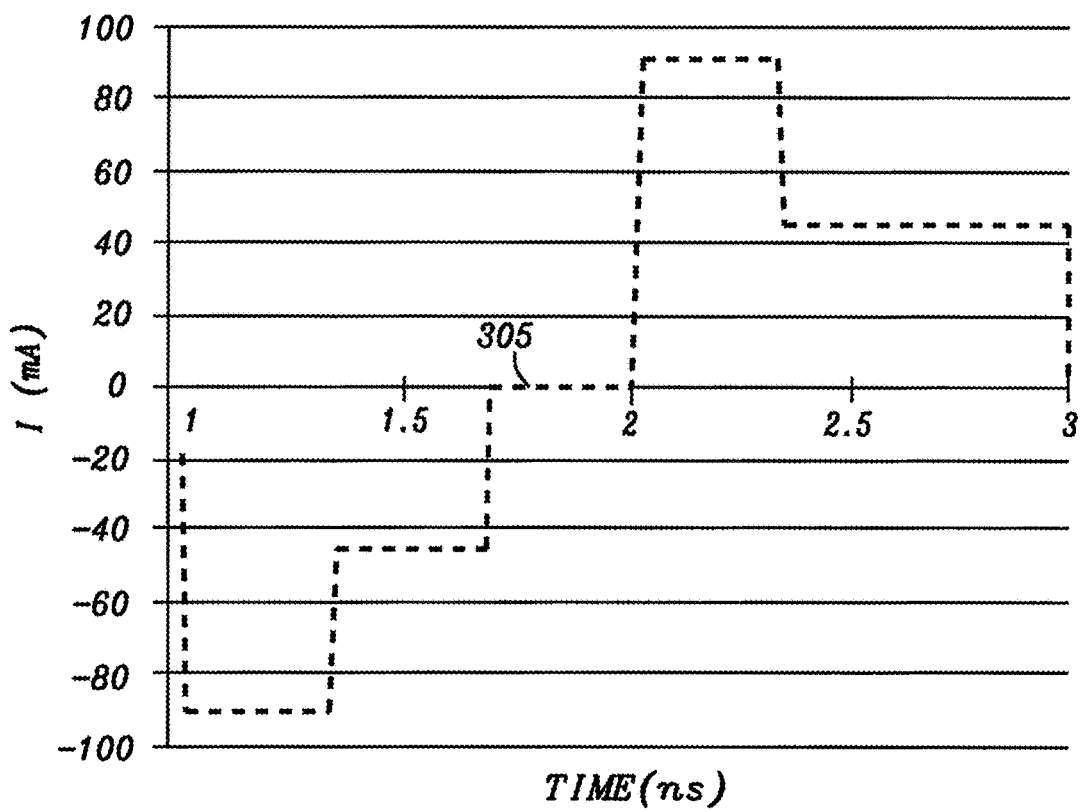
Figure 6C:
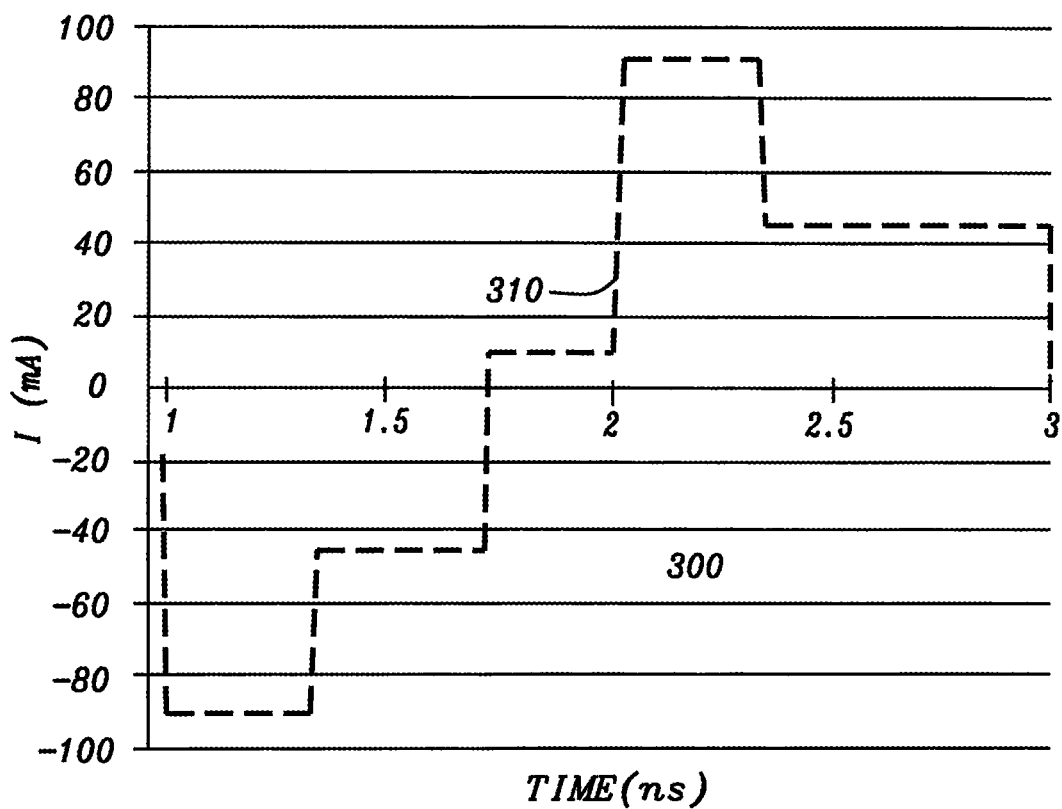
Figure 6D:
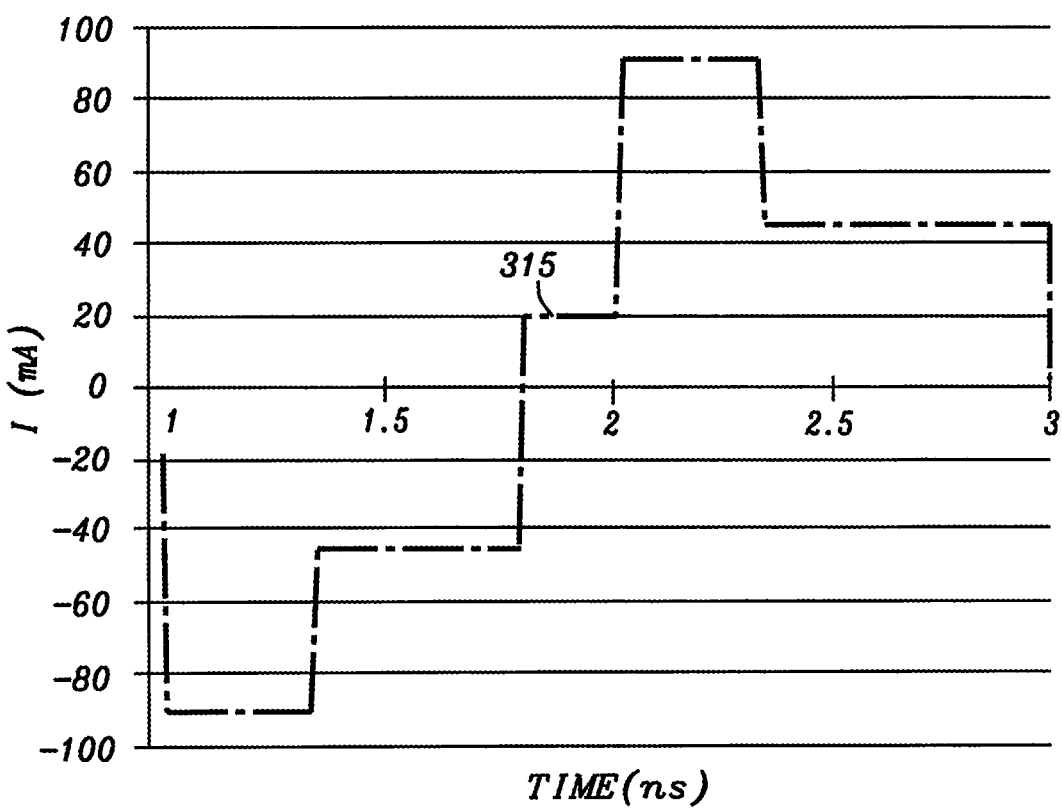
Figure 6E:
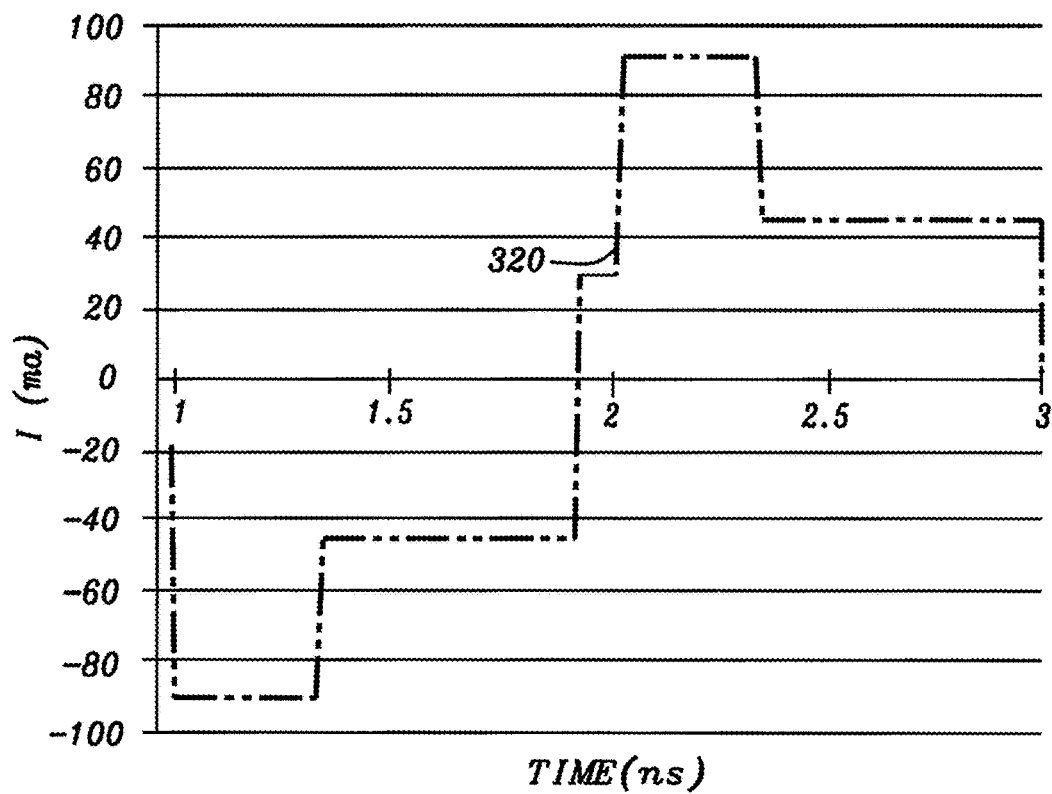

| LABEL DESIGNATION | CURRENT LEVEL |
| --- | --- |
| FIG. 6A 300 | 45 ma POR |
| FIG. 6B 305 | 0 mA |
| FIG. 6C 310 | −10 mA |
| FIG. 6D 315 | −20 mA |
| FIG. 6E 320 | −30 mA |

Figure 7:
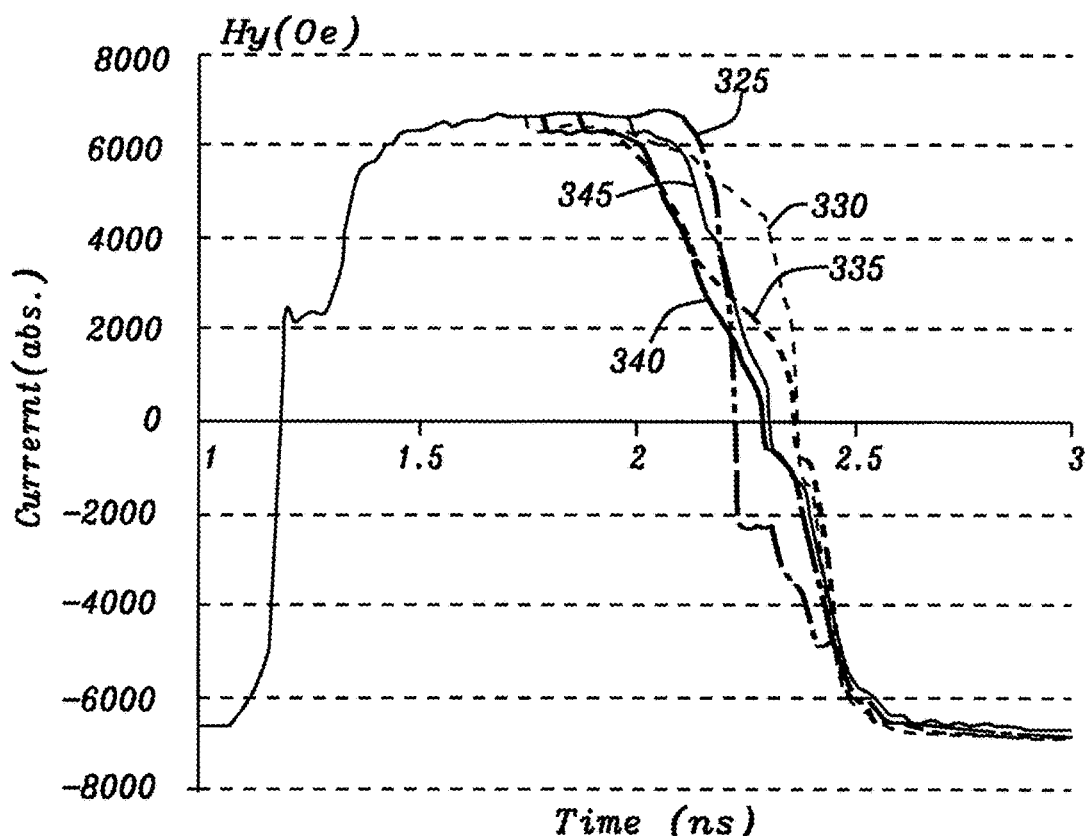
FIG. 7 is a plot of the calculated magnetic fields versus time for the write current profiles of FIG. 6 using the controller and preamplifier embodying the principles of the present disclosure.
Figure 8A:
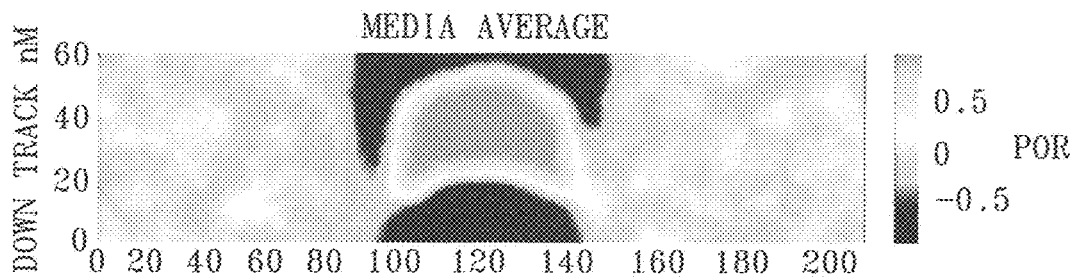
FIGS. 8A-8E illustrate media recording patterns for power-on reset (POR) current waveform and MPRZ waveforms.
Figure 8B:
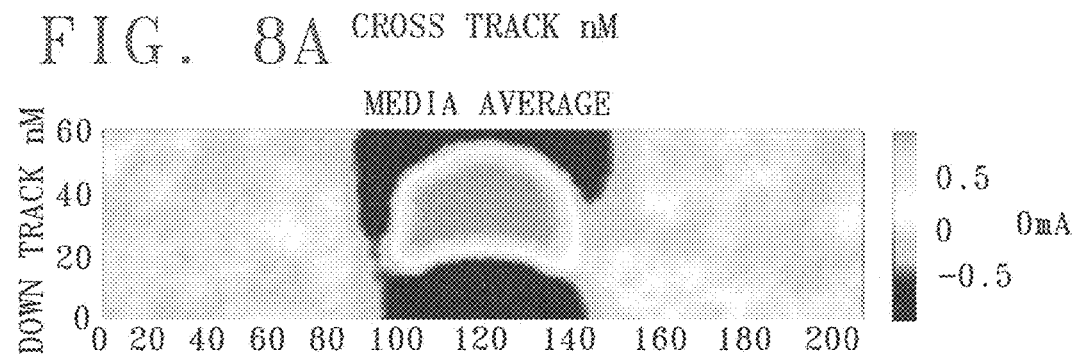
Figure 8C:
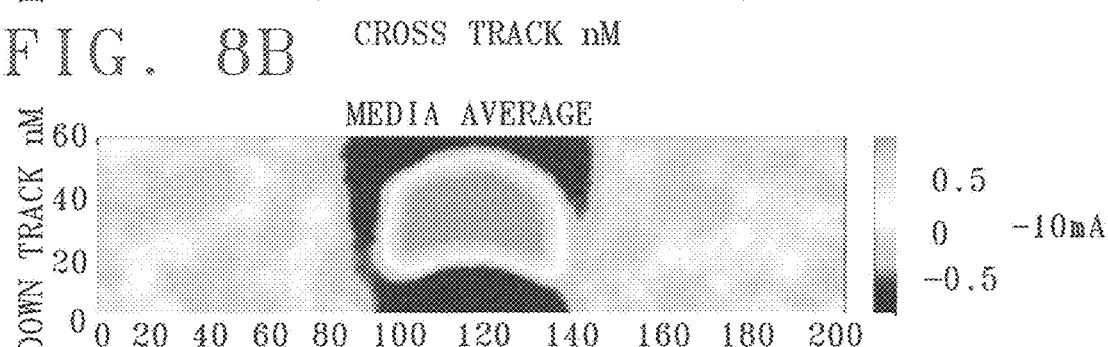
Figure 8D:
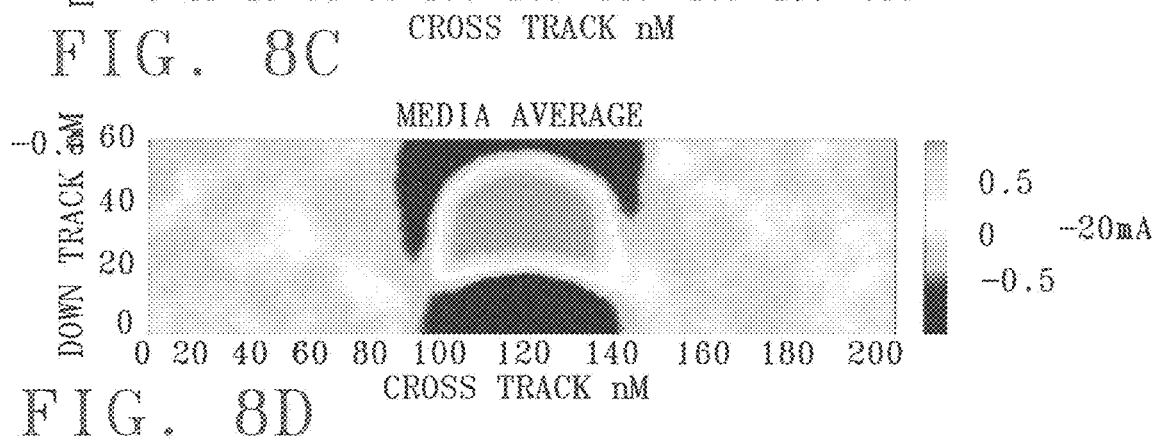
Figure 8E:
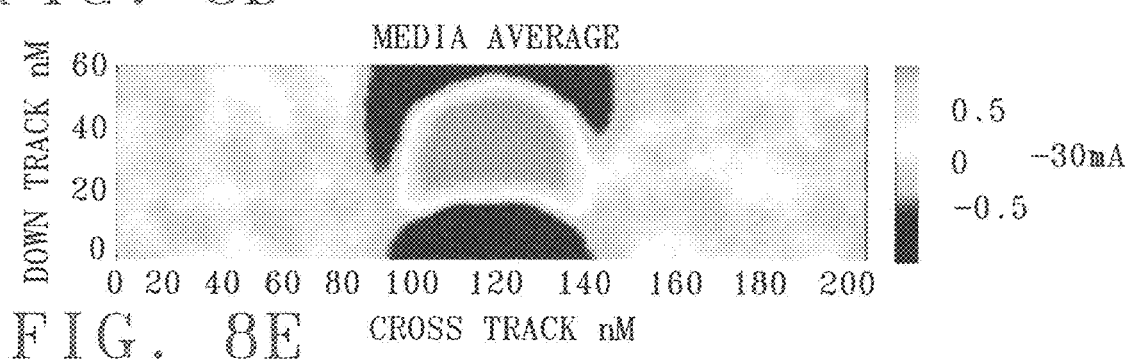

FIG. 7 of is a plot of the calculated magnetic recording fields versus time for the MPRZ write current $I_{W\_MPRZ}$ levels profiles of FIG. 6 using the controller and preamplifier of FIG. 4 embodying the principles of the present disclosure. The corresponding recording magnetic fields, as indicated in Table 2 are calculated in micromagnetic modeling and shown in FIG. 7. From the dynamic magnetic field Hy profiles, the slow main pole relaxation can be observed, especially for MPRZ write current $I_{W\_MPRZ}$ levels in 0 mA to −20 mA range (curves 357, 359, 361). The benefits of concatenating the main pole relaxation zone at the end of the signal data segment of the write current waveform will be explained hereinafter.

TABLE 2

| LABEL DESIGNATION | CURRENT LEVEL |
| --- | --- |
| 325 | POR |
| 330 | 0 |
| 335 | 10 |
| 340 | 20 |
| 345 | 30 |

FIGS. 8A-8E illustrate media recording patterns for the write current $I_W$, the overshoot amplitude OSA, and the overshoot duration OSD that form the POR current waveform and MPRZ waveforms, as shown in FIG. 6. FIG. 8F is a table illustrating the signal to noise ratio (SNR) comparison of media recording patterns for POR current waveform and MPRZ waveforms, as shown in FIG. 6. In FIG. 8F, the recording media patterns indicate that if the MPRZ write current $I_{W\_MPRZ}$ levels are set to 0 mA or negative, media recording patterns didn't degrade the bit. In FIG. 8F, the SNR is even improved due to fast switching in the 2nd half rise time, and the media bits per inch BPI can be improved.

The main pole relaxation zone write current $I_{W\_MPRZ}$ and main pole relaxation zone duration MPRZx is optimized by sweeping the main pole relaxation zone write current $I_{W\_MPRZ}$ from a negative write current −Iw to a positive write current +Iw to achieve the following two purposes. The first purpose is to keep the on-track signal to noise ratio SNR and to reduce a write bubble width of a long recording time T, which will improve the tracks per inch (TPI) and areal density capability (ADC) in PMR heads. The second purpose is permitting the magnetic field from the main pole (FIG. 7) to switch more rapidly between different field polarities and achieve a better signal to noise ratio SNR in FIG. 8F and thus improve the bits per inch density BPI and the areal density capability (ADC) in PMR heads.

Figure 9A:
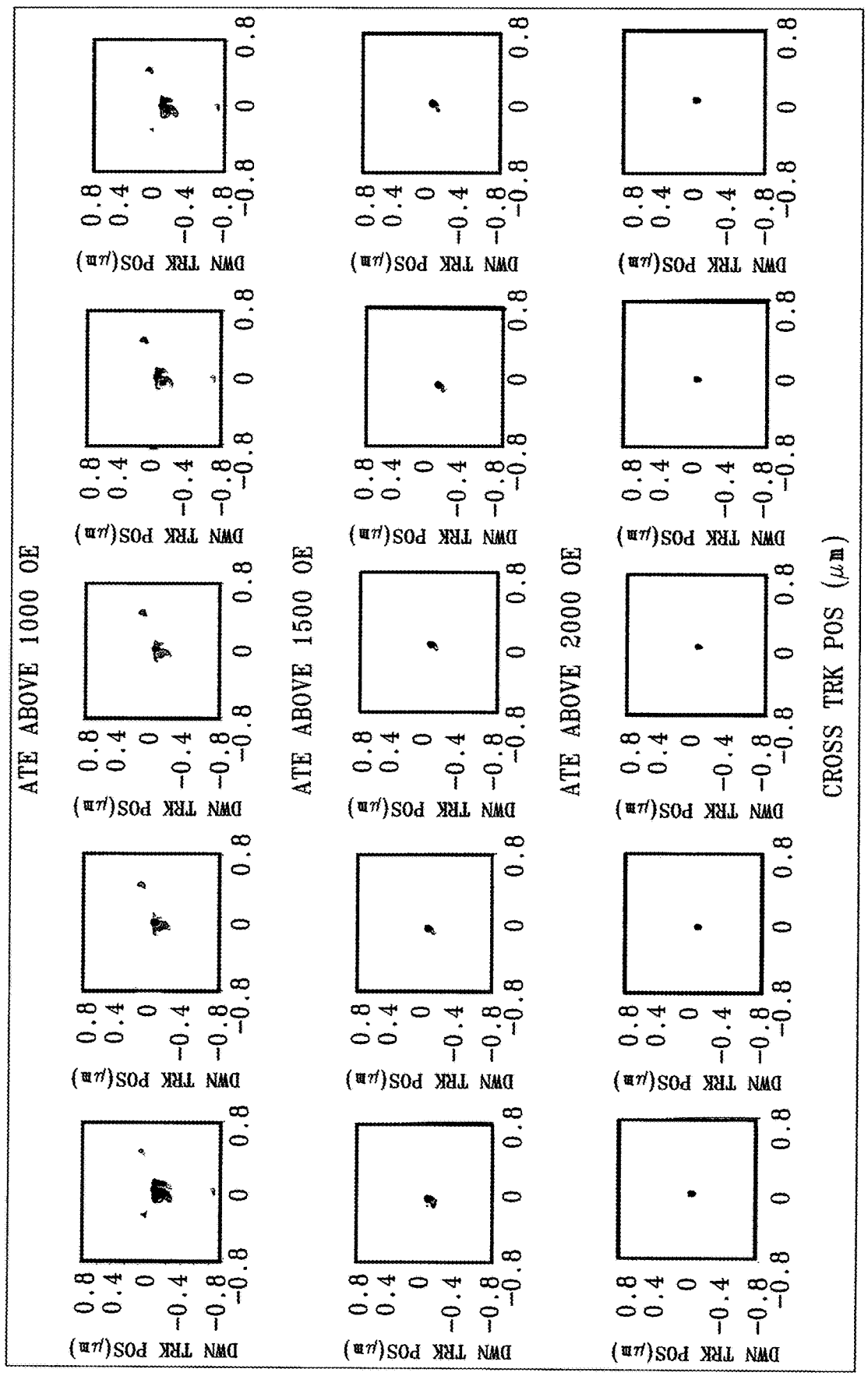
FIG. 9A illustrates a footprint of 2D magnetic field distribution on the recording media plane.

FIG. 9A illustrates a footprint of a 2D magnetic field distribution on the recording media plane. In the first column of FIG. 9A, the POR current waveform will generate side track erasure (STE) on media. By reducing the main pole relaxation zone current Iw_MPRZ successively from 0 mA to −10 mA, from 10 mA to-20 mA, to create the second, third, and fourth columns of FIG. 9A accordingly. The calculated side track erasure (STE) is reduced, as shown in FIG. 9B. The possible reason for the decrease in the STE in main pole zone relaxation current $I_{W\_}$MPRZ in the MPRZ zone will mitigate stray field leakage from the PMR write head during main pole field switching.

FIG. 9B is a table of the side track erasure (STE) for the POR current waveform and the MPRZ waveform currents. The units for the STE are arbitrary. In the simulation of FIG. 9A, if the stray field of the air bearing surface (abs) is greater than the threshold (Hth) of the magnetic field strength H as measured in amperes per meter (A/m) at one mesh, erasure at this location (mesh) counts as 1. The threshold (Hth) is equal to 1000 Oe, 1500 Oe, and 2000 Oe, respectively, in the first, second, and third row of FIG. 9A. Adjacent track interference (ATI) is defined as +/−1 track erasure, which is the integration of erasure of each mesh along the down track of +/−1 tracks. STE is defined as the sum of erasures of all +/−n=1, 2, 3 . . . tracks, which includes adjacent track interference (ATI). The final sum will be normalized by a fixed number. The fringing is defined as a magnetic write width (MWW) less than the main pole size. With the fixed main pole size, the bigger fringing, the worse adjacent track interference (ATI) (+/−1 tracks) are just next to the main pole and will be affected first, then the second and third tracks on either side of the first track near to the main pole.

Figure 10:
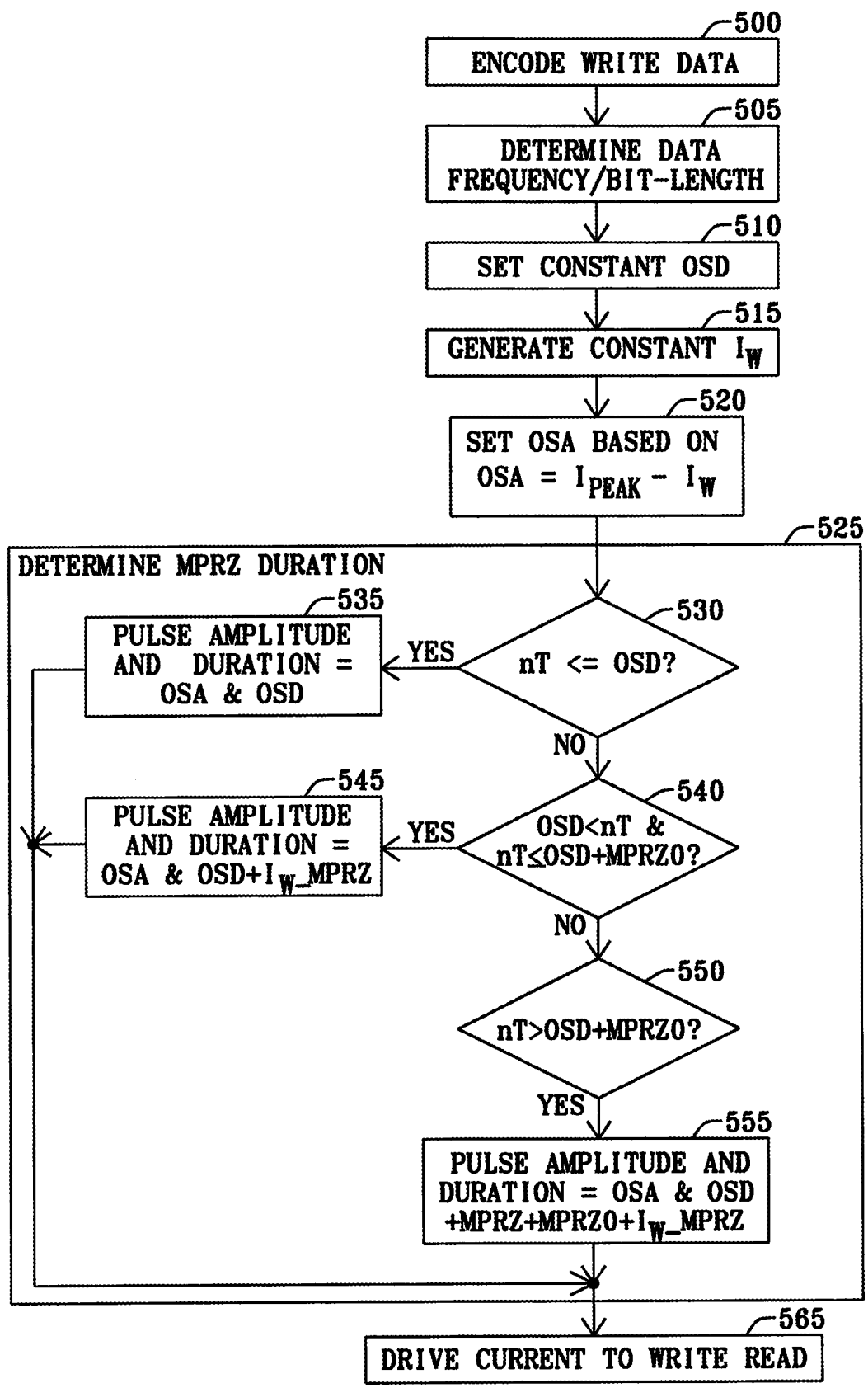
FIG. 10 is a flow chart of the method for determining a main pole relaxation zone and a write current for a perpendicular magnetic recording head embodying the principles of the present disclosure.

FIG. 10 is a flow chart of the method for determining a main pole relaxation zone in a write current for a perpendicular magnetic recording head. The method begins with encoding (Box 500) the data to be written to a non-return to zero (NRZI) encoding format. The data frequency and bit length are determined (Box 505). The overshoot duration (OSD) is then determined (Box 510), and a constant write current ($I_W$) is generated (Box 515). The overshoot amplitude (OSA) is then determined (Box 520) as the difference between the peak current ($I_{PEAK}$) and the write current ($I_W$) (OSA=$I_{PEAK}$−$I_W$).

The duration of the main pole relaxation zone (MPRZ) is determined (Box 525). The overshoot duration (OSD) of the NRZI modulated conversion code word is compared (Box 530) to the number of clock transitions (nT) of the NRZI modulated conversion code word. If the NRZI modulated conversion code word time interval is less than or equal to the number of clock transitions (nT), the pulse amplitude and duration of the NRZI modulated conversion code word is set (Box 535) the overshoot amplitude (OSA) and the overshoot duration (OSD). The head current is then written (Box 565) to the write head 245 of FIG. 4.

If the NRZI modulated conversion code word time interval is not less than or equal to the number of clock transitions (nT), the overshoot duration (OSD) of the NRZI modulated conversion code word and the sum of the overshoot duration (OSD and the period of the main pole relaxation zone (MPRZ0) period is compared (Box 540) to the number of clock transitions (nT) of the NRZI modulated conversion code word. If the overshoot duration (OSD) is less than or equal the number of clock transitions (nT) of the NRZI modulated conversion code word and the number of clock transitions (nT) is less than or equal to the sum of the number of clock transitions (nT) and the main pole relaxation zone period (MPRZ0), the current waveform of this NRZI modulated conversion code word is set (Box 545) to the overshoot current and the main pole relaxation zone MPRZ having a current level equal to the write current $I_{W\_}$MPRZ. The overshoot current is defined by overshoot amplitude (OSA) and overshoot duration (OSD). The head current is then written (Box 565) to the write head 245 of FIG. 4.

If the overshoot duration (OSD) is less than or equal the number of clock transitions (nT) of the NRZI modulated conversion code word and the number of clock transitions (nT) is less than or equal to the sum of the number of clock transitions (nT) and the main pole relaxation zone period (MPRZ0), the sum of the overshoot duration (OSD and the period of the main pole relaxation zone period (MPRZ0) is compared (Box 550) to the number of clock transitions (nT) of the NRZI modulated conversion code word. If the number of clock transitions (nT) of the NRZI modulated conversion code word is greater than the sum of the overshoot duration (OSD) and the period of the main pole relaxation zone period (MPRZ0), the pulse amplitude and duration of the NRZI modulated conversion code word is set (Box 555) to the overshoot amplitude and duration appended to a main pole relaxation zone MPRZ, a main pole relaxation zone at the reference level MPRZ0, and a write current main pole relaxation zone $I_{W\_}$MPRZ. The head current is then written (Box 565) to the write head 245 of FIG. 4.

Figure 11:
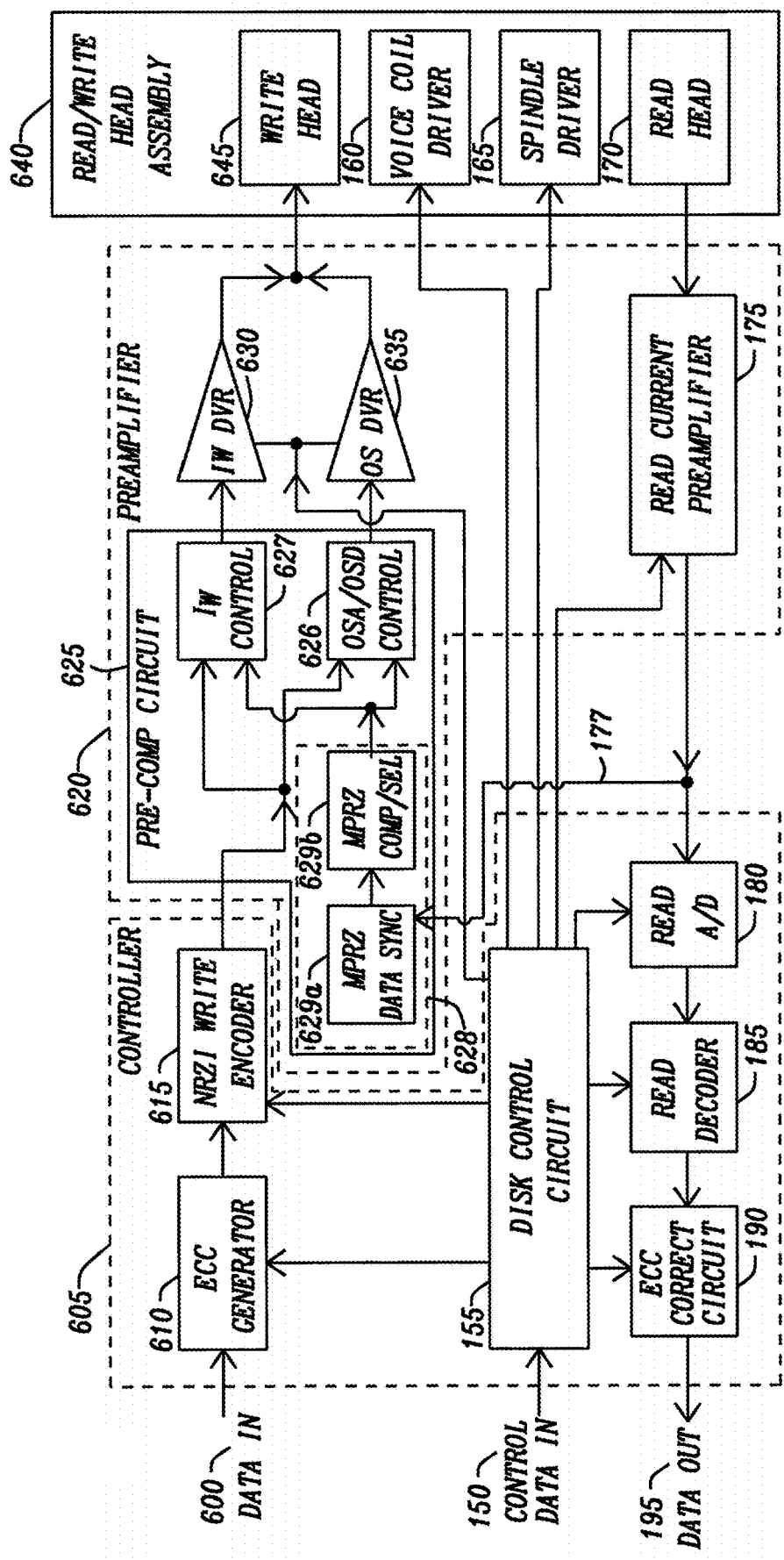
FIG. 11 is a block diagram of another embodiment of a controller and preamplifier embodying the principles of the present disclosure.

FIG. 11 is a block diagram of another embodiment of a controller and preamplifier embodying the principles of the present disclosure. The structure of the controller and preamplifier embodying the principles of the present disclosure is similar to that of the controller and preamplifier, as shown in FIG. 4. The input data 600 is transferred to a controller circuit 605 and is applied to an Error Correction Code (ECC) circuit 610 that generates an ECC code from the input data that is appended to the input data. The input data with the appended ECC Code is then an input to an NRZI write encoder 615 that converts the input data 600 with the appended ECC code to an NRZI modulated conversion code acceptable to the hard disk media for writing the data to the hard disk. The NRZI modulated conversion code word is then transferred to a preamplifier 620 and thus to a pre-compensation circuit 625. The NRZI modulated conversion code word is conditioned to accommodate the transmission line characteristics of the trace 45 of FIG. 1 and the requirements of the magnetic disk 60 for correctly writing the data efficiently to the magnetic disk 60.

The NRZI modulated conversion code word is applied to the overshoot control circuit 626 and the write control circuit 627 of the pre-compensation circuit 625. The overshoot control circuit 626 is configured to control the overshoot amplitude (OSA), and the overshoot duration (OSD) of the first bit transition of the NRZI modulated conversion code word. The overshoot amplitude (OSA) and the overshoot duration (OSD) are used to boost the magnetic recording field rise time for fast writing the transition between sequential bits, especially in high data rate recording.

The write control circuit 627 is configured to set the write current $I_W$ to a sufficient current amplitude to drive the main pole to generate the magnetic recording field strength Hy to an appropriate level for recording the data.

The NRZI modulated conversion code word is also applied to the main pole relaxation zone (MPRZ) control circuit 628. The MPRZ control circuit 628 is configured to generate an MPRZ current signal that is placed prior to the next transition of the NRZI modulated conversion code word. The MPRZ control circuit 628 has an MPRZ data synchronization circuit 629a that receives the pseudorandom patterns generated from reader channel 177 that determines if a write current main pole relaxation period is to be added to the NRZI modulated conversion code word. The output of the MPRZ data synchronization circuit 629a is the input to the MPRZ comparison/selection circuit 629b. The MPRZ comparison/selection circuit 629b is configured for executing the MPRZ determination process for determining a main pole relaxation zone in a write current for a perpendicular magnetic recording head of FIG. 10.

The pre-compensated data is applied to the write current driver 630 and the overshoot amplitude driver 635. The structure of the pre-compensated waveform includes the overshoot amplitude (OSA) and overshoot duration (OSD) to boost the magnetic recording field rise time and write sharp transitions between sequential bits. The write current ($I_W$) is concatenated to the overshoot current and set to lower the current level of less than 30 mA and preferably approximately 15 mA to 20 mA. Based on the MPRZ determination process for determining a main pole relaxation zone in a write current for a perpendicular magnetic recording head, the MPRZ current is placed as the buffer zone after the overshoot current.

The overshoot current and the concatenated write current $I_W$ with the main pole relaxation zone with a main pole relaxation zone duration (MPRZ0) and a current level equal to the write current $I_{W\_MPRZ}$ are transferred to the PMR write head 15 in the read/write head assembly 640. The overshoot current and the concatenated main pole relaxation zone write current $I_{W\_MPRZ}$ is applied to the magnetic disk 60 to record the pre-compensated data to the magnetic disk 60.

The write control path is the same as that of FIG. 2, where the write control data 150 is received by the disk controller circuit 155 for supervising the encoding, decoding, synchronization control of the hard disk drive 10 of FIG. 1.

Figure 12:
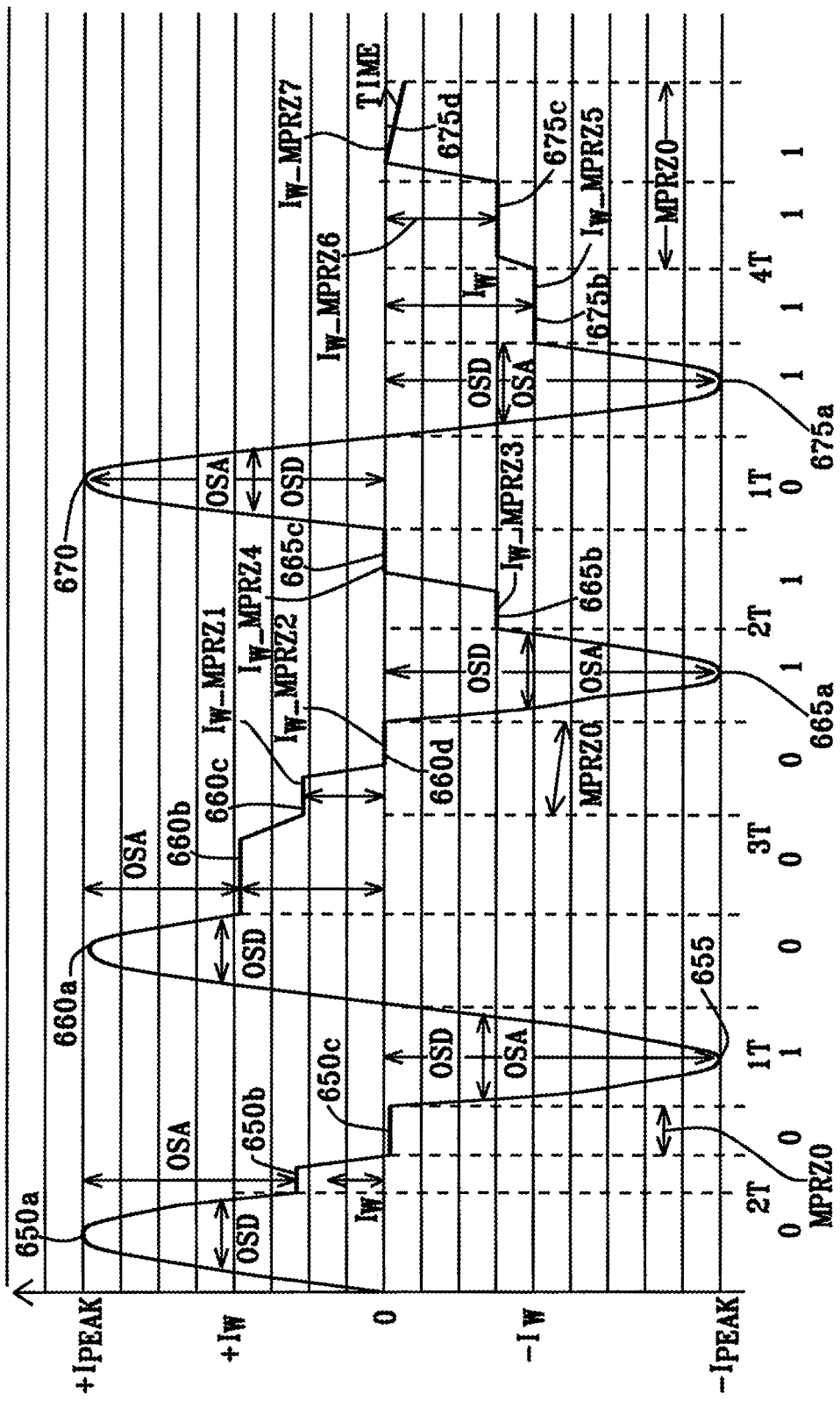
FIG. 12 is a plot of the write current waveform at the output of the preamplifier of FIG. 11 to the input of the perpendicular magnetic recording (PMR) head illustrating the main pole relaxation zone embodying the principles of the present disclosure.

FIG. 12 is a plot of the write current waveform at the output of the preamplifier of FIG. 11 to the input of the perpendicular magnetic recording (PMR) head illustrating the main pole relaxation zone embodying the principles of the present disclosure. The write current waveform as illustrated shows a data transmission of a coding of digital data stream equal to (0, 0, 1, 0, 0 0, 1, 1, 0, 1, 1, 1, 1). The first signal data segment of the NRZI modulated conversion code word waveform is a positive transition 650a and 650b. The first portion 650a of the first signal data is an overshoot signal 650a of a transition to a zero data showing the overshoot amplitude (OSA) and the overshoot duration (OSD). The second portion 650b is a write current level $I_W$ and the third portion 650c is a main pole relaxation zone set at the ground reference level having a duration MPRZ0 indicating a second consecutive zero data having no transition. The second signal data segment 655 of the write current waveform is a single data bit with a negative overshoot (undershoot) signal representing a data value (1).

The third signal data segment of the write current waveform is a positive transition 660a, 660b, 660c, and 660d representing a data value of three consecutive zeros. The fourth portion of the write current waveform is a positive overshoot signal 660a with an overshoot amplitude (OSA) and overshoot duration (OSD) that is tuned to achieve the optimal bits per inch (BPI), tracks per inch (TPI) and areal density capability (ADC). The fifth portion 660b of the write current waveform includes the write current $I_W$ that sets the sufficient current amplitude to drive the main pole to generate the magnetic recording filed strength Hy. The sixth portion 660c of the write current waveform is the main pole relaxation zone $I_W$MPRZ1. The seventh portion 660d is the second main pole relaxation zone $I_W$MPRZ2 is set at the ground reference level. The main pole relaxation zones 660c and 660d provide a buffer zone for main pole relaxation from saturation status to a remanence state before writing the next bit.

The fourth signal data segment of the write current waveform is a negative transition 665a and 665b representing the data value of two consecutive ones. The first signal portion 665a is a negative overshoot (undershoot) signal representing a data value (1). The second signal portion 665b of the write current waveform is the main pole relaxation zone MPRZ3. The write current main pole relaxation zone MPRZ3 that is at a negative voltage that is more positive than the negative peak current $-I_{PEAK}$ of the overshoot amplitude OSA. The third portion 665c of the write current waveform is a second main pole relaxation zone $I_W$MPRZ4 that is set to the ground reference level. The main pole relaxation zones 665b and 665c provide a buffer zone for main pole relaxation from saturation status to a remanence state before writing the next bit.

The fifth signal data segment of the write current waveform is a positive transition 670 is a single data zero with an overshoot signal of a transition to the zero data. Since there is a single data bit for the data transition 670, the only portion of the write current waveform is a positive overshoot signal 670 with an overshoot amplitude (OSA) and overshoot duration (OSD).

The sixth signal data segment of the write current waveform is a negative transition 675a, 675b, 675c, and 675d. The first portion 675a of the sixth signal data segment is a negative overshoot signal 675a with an overshoot amplitude (OSA) and overshoot duration (OSD). The second portion 675b of the sixth signal data segment of the write current waveform includes the write current main pole relaxation zone $I_W$MPRZ5 that sets the sufficient current amplitude $I_W$ to drive the main pole to generate the magnetic recording filed strength Hy. The third portion 675c of the sixth signal data segment of the write current waveform that is the main pole relaxation zone MPRZ6. The fourth portion 675d of the sixth signal data segment is the main pole relaxation zone MPRZ7 is set at the ground reference level. The main pole relaxation zones $I_W$MPRZ5, $I_W$MPRZ6, and $I_W$MPRZ7 provide a buffer zone for main pole relaxation from saturation status to remanence state before writing the next bit. While the main pole relaxation zones $I_W$MPRZ5, $I_W$MPRZ6, and $I_W$MPRZ7 are set to various current levels, the current waveform in the main pole relaxation zones $I_W$MPRZ5, $I_W$MPRZ6 and $I_W$MPRZ7 may be optimized in different shapes to achieve the best recording performance.

Conceptually, each bit has a main pole relaxation zone current IWMPRZx and main pole relaxation zone current duration MPRZx that will require additional registers. To simplify the design of the preamplifier 620, all main pole relaxation zone currents IWMPRZx (x=0, 1, 2 . . . ) and main pole relaxation zone current durations MPRZx (x=0, 1, 2 . . . ), preferably, should be equal such that only two registers are added. Both scenarios embody the principles of the present disclosure While this disclosure has been particularly shown and described with reference to the preferred embodiments thereof, it will be understood by those skilled in the art that various changes in form and details may be made without departing from the spirit and scope of the disclosure.

What is claimed is:

1. A preamplifier mounted on the head arm assembly and connected to a controller circuit for receiving an NRZI modulated conversion code adapted from the input data, the preamplifier comprising:
   a main pole relaxation control circuit configured for generating a main pole relaxation zone current that is concatenated with an overshoot current zone of a magnetic head write current applied to a PMR write head within the head arm assembly, wherein the main pole relaxation control circuit comprises:
      a main pole relaxation zone data synchronization circuit that is in communication with a read data preamplifier to receive a pseudorandom read data signal that is dependent on the bit length of the encoded data, wherein the pseudorandom read data signal is applied to a main pole relaxation zone data synchronization circuit to generate a main pole relaxation current to be concatenated with the overshoot current; and
      a comparator/selector configured for determining waveform of the main pole relaxation zone current, wherein the output of the main pole relaxation control circuit is applied to a write current driver and an overshoot driver to concatenate the main pole relaxation zone current with the overshoot current and the write current to form a write data current signal that is applied to the PMR write head for writing the encoded data to the HDD media.

2. The preamplifier of claim 1 further comprising a write current control circuit configured for constructing a write current waveform with amplitude and duration, wherein the write current is concatenated with the overshoot current zone and the main pole relaxation zone current is appended to the write current.

3. The preamplifier of claim 2 wherein the write current control circuit is connected to the write control driver from transferring the write control current to the write current driver to be concatenated with the main pole relaxation zone current.

4. The preamplifier of claim 2 further comprising an overshoot control circuit for controlling the amplitude and duration of the overshoot current for each NRZI modulated conversion code.

5. The preamplifier of claim 4, wherein the overshoot control circuit is connected to the overshoot driver for concatenating the overshoot current with the write current and the main pole relaxation zone current.

6. The preamplifier of claim 1, wherein the main pole data synchronization circuit determines the duration of the main pole relaxation zone.

7. The preamplifier of claim 6 wherein the comparator/selector compares the overshoot duration of the NRZI modulated conversion code word to the number of clock transitions of NRZI modulated conversion code word, wherein when the NRZI modulated conversion code word time interval is less than or equal to the number of clock transitions, the pulse amplitude and duration of the NRZI modulated conversion code word is set to the overshoot amplitude and the overshoot duration, and the head current is then written to the PMR write head.

8. The preamplifier of claim 6 wherein when the NRZI modulated conversion code word time interval is not less than or equal to the number of clock transitions, the comparator/selector compares the overshoot duration of the NRZI modulated conversion code word and the sum of the overshoot duration and the period of the main pole relaxation zone period to the number of clock transitions of the NRZI modulated conversion code word, wherein when the overshoot duration is less than or equal the number of clock transitions of the NRZI modulated conversion code word and the number of clock transitions is less than or equal to the sum of the number of clock transitions and the main pole relaxation zone period, the current waveform of this NRZI modulated conversion code word is set to the overshoot current and the main pole relaxation zone having a current level equal to the main pole relaxation zone write current, wherein the overshoot current is defined by overshoot amplitude and overshoot duration and the head current is then written to the write head.

9. The preamplifier of claim 6 wherein when the overshoot duration is less than or equal the number of clock transitions of the NRZI modulated conversion code word and the number of clock transitions is less than or equal to the sum of the number of clock transitions and the main pole relaxation zone period, comparator/selector compares the sum of the overshoot duration and the period of the main pole relaxation zone period to the number of clock transitions of the NRZI modulated conversion code word, when the number of clock transitions of the NRZI modulated conversion code word is greater than the sum of the overshoot duration and the period of the main pole relaxation zone period, the pulse amplitude and duration of the NRZI modulated conversion code word is set to the overshoot amplitude and duration appended to a main pole relaxation zone MPRZ, a main pole relaxation zone is set at the reference level, and a main pole relaxation zone write current, and the head current is then written to the write head.

10. The preamplifier of claim 6 wherein the write data current signal as structured with the overshoot current zone, the write current zone, and the main pole relaxation zone current concatenated pre-compensates the data current signal by fine-tuning overshoot current settings, the write current setting, main pole relaxation zone current settings to achieve an optimum number of the bits per inch, an optimum number of the tracks per inch, and an optimum areal density capability.

11. A method for determining a main pole relaxation zone in a write current for a PMR write head within the head arm assembly, comprising the steps of:
   encoding data into an NRZI modulated conversion code word that is to be written to the perpendicular magnetic recording head to an NRZI encoding format;
   determining a data frequency and bit length of the encoded data;
   determining an overshoot duration of a current overshoot zone;
   generating a constant write current zone;
   setting the amplitude of the overshoot current zone as the difference between a peak current of the overshoot current zone and a constant write current of the constant write current zone;
   determining a duration of the main pole relaxation zone;
   comparing the overshoot duration of the NRZI modulated conversion code word with the number of clock transitions of NRZI modulated conversion code word;
   when the NRZI modulated conversion code word time interval is less than or equal to the number of clock transitions, setting the pulse amplitude and duration of the NRZI modulated conversion code word to the overshoot amplitude and the overshoot duration; and
   writing the head current to the PMR write head.

12. The method for determining a main pole relaxation zone of claim 11 further comprising the steps of:
comparing the overshoot duration of the NRZI modulated conversion code word with the number of clock transitions of NRZI modulated conversion code word;
when the NRZI modulated conversion code word time interval is less than or equal to the number of clock transitions, setting the pulse amplitude and duration of the NRZI modulated conversion code word to the overshoot amplitude and the overshoot duration concatenated with the main pole relaxation zone write; and
writing the head current to the PMR write head.

13. The method for determining a main pole relaxation zone of claim 11 further comprising the steps of:
when the NRZI modulated conversion code word time interval is not less than or equal to the number of clock transitions, comparing the overshoot duration of the NRZI modulated conversion code word and the sum of the overshoot duration and the period of the main pole relaxation zone period with the number of clock transitions of the NRZI modulated conversion code word;
when the overshoot duration is less than or equal the number of clock transitions of the NRZI modulated conversion code word and the number of clock transitions is less than or equal to the sum of the number of clock transitions and the main pole relaxation zone period, setting the current waveform of this NRZI modulated conversion code word to the overshoot current and the main pole relaxation zone MPRZ having a current level equal to the main pole relaxation zone write current;
defining the overshoot current by overshoot amplitude and overshoot duration;
writing the head current to the PMR write head.

14. The method for determining a main pole relaxation zone of claim 11 further comprising the steps of:
when the overshoot duration is less than or equal the number of clock transitions of the NRZI modulated conversion code word and the number of clock transitions is less than or equal to the sum of the number of clock transitions and the main pole relaxation zone period, comparing the sum of the overshoot duration and the period of the main pole relaxation zone period with the number of clock transitions of the NRZI modulated conversion code word;
when the number of clock transitions of the NRZI modulated conversion code word is greater than the sum of the overshoot duration and the period of the main pole relaxation zone period, the pulse amplitude and duration of the NRZI modulated conversion code word is set to the overshoot amplitude and duration appended to a main pole relaxation zone MPRZ, a main pole relaxation zone at the reference level MPRZ0, and a main pole relaxation zone write current; and
writing the head current to the write head.

15. The method for determining a main pole relaxation zone of claim 14 further comprising the step of:
when the number of clock transitions of the NRZI modulated conversion code word is not greater than the sum of the overshoot duration and the period of the main pole relaxation zone period, generating an error condition.

16. A magnetic hard disk drive comprising:
a controller comprising:
an ECC generator for receiving input data and generating an ECC code word appended to the input data;
an NRZI write encoder for converting the input data with the appended ECC code word into an NRZI modulated conversion code word; and
a preamplifier mounted on the head arm assembly and connected to a controller circuit for receiving an NRZI modulated conversion code adapted from the input data, the preamplifier comprising:
a main pole relaxation control circuit configured for generating a main pole relaxation zone current that is concatenated with an overshoot current zone of a magnetic head write current applied to a PMR write head within the head arm assembly, wherein the main pole relaxation control circuit comprises:
a main pole relaxation zone data synchronization circuit that is in communication with a read data preamplifier to receive a pseudorandom read data signal that is dependent on the bit length of the encoded data, wherein the pseudorandom read data signal is applied to a main pole relaxation zone data synchronization circuit to generate a main pole relaxation current to be concatenated with the overshoot current; and
a comparator/selector configured for determining waveform of the main pole relaxation zone current, wherein the output of the main pole relaxation control circuit is applied to a write current driver and an overshoot driver to concatenate the main pole relaxation zone current with the overshoot current and the write current to form a write data current signal that is applied to the PMR write head for writing the encoded data to the HDD media.

17. The magnetic hard disk drive of claim 16 wherein the preamplifier further comprises a write current control circuit configured for constructing a write current waveform with amplitude and duration, wherein the write current is concatenated with the overshoot current zone and the main pole relaxation zone current is appended to the write current.

18. The magnetic hard disk drive of claim 17 wherein the write current control circuit is connected to the write control driver from transferring the write control current to the write current driver to be concatenated with the main pole relaxation zone current.

19. The magnetic hard disk drive of claim 18 wherein the preamplifier further comprises an overshoot control circuit for controlling the amplitude and duration of the overshoot current for each NRZI modulated conversion code.

20. The magnetic hard disk drive of claim 19 wherein the overshoot control circuit is connected to the overshoot driver for concatenating the overshoot current with the write current and the main pole relaxation zone current.

21. The magnetic hard disk drive of claim 16, wherein the main pole data synchronization circuit determines the duration of the main pole relaxation zone.

22. The magnetic hard disk drive of claim 21 wherein the comparator/selector compares the overshoot duration of the NRZI modulated conversion code word to the number of clock transitions of NRZI modulated conversion code word, wherein when the NRZI modulated conversion code word time interval is less than or equal to the number of clock transitions, the pulse amplitude and duration of the NRZI modulated conversion code word is set to the overshoot amplitude and the overshoot duration, and the head current is then written to the PMR write head.

23. The magnetic hard disk drive of claim 21 wherein when the NRZI modulated conversion code word time interval is not less than or equal to the number of clock transitions, the comparator/selector compares the overshoot duration of the NRZI modulated conversion code word and the sum of the overshoot duration and the period of the main pole relaxation zone period to the number of clock transitions of the NRZI modulated conversion code word, wherein when the overshoot duration is less than or equal the number of clock transitions of the NRZI modulated conversion code word and the number of clock transitions is less than or equal to the sum of the number of clock transitions and the main pole relaxation zone period, the current waveform of this NRZI modulated conversion code word is set to the overshoot current and the main pole relaxation zone having a current level equal to the main pole relaxation zone write current, wherein the overshoot current is defined by overshoot amplitude and overshoot duration and the head current is then written to the write head.

24. The magnetic hard disk drive of claim 21 wherein when the overshoot duration is less than or equal the number of clock transitions of the NRZI modulated conversion code word and the number of clock transitions is less than or equal to the sum of the number of clock transitions and the main pole relaxation zone period, comparator/selector compares the sum of the overshoot duration and the period of the main pole relaxation zone period to the number of clock transitions of the NRZI modulated conversion code word, when the number of clock transitions of the NRZI modulated conversion code word is greater than the sum of the overshoot duration and the period of the main pole relaxation zone period, the pulse amplitude and duration of the NRZI modulated conversion code word is set to the overshoot amplitude and duration appended to a main pole relaxation zone MPRZ, a main pole relaxation zone is set at the reference level, and a main pole relaxation zone write current, and the head current is then written to the write head.

25. The magnetic hard disk drive of claim 21 wherein the write data current signal as structured with the overshoot current zone, the write current zone, and the main pole relaxation zone current concatenated pre-compensates the data current by fine-tuning overshoot current settings, the write current setting, main pole relaxation zone current settings to achieve an optimum number of the bits per inch (BPI), an optimum number of the tracks per inch, and an optimum areal density capability.

26. The magnetic hard disk drive of claim 16 wherein the preamplifier further comprises:
    a write current driver connected to receive the pre-compensated data current and configured for writing the pre-compensated data current to the PMR write head; and
    an overshoot driver connected to receive the pre-compensated data current and configured for concatenating the overshoot current with pre-compensated data current for writing the data to the write head.

27. The magnetic hard disk drive of claim 16 wherein the preamplifier further comprises:
    a read current preamplifier that receives a read data current from a PMR read head within the head arm assembly and amplifies the read data current.

28. The magnetic hard disk drive of claim 27 wherein the controller further comprises
    a read current analog to digital converter connected for receiving the read data current and convert it to an NRZI coded read data;
    an NRZI read decoder configured for decoding the NRZI coded read data to output data with an appended ECC code word;
    an ECC correction circuit connected for receiving the output data with an appended ECC code word and configured for evaluating the output data and appended ECC code word to determine when errors occur and correct the output data and transferring the output data to external circuitry.

* * * * *